(12) United States Patent
Kwon et al.

(10) Patent No.: US 12,474,740 B2
(45) Date of Patent: Nov. 18, 2025

(54) ELECTRONIC DEVICE COMPRISING FLEXIBLE DISPLAY AND OPERATING METHOD THEREOF

(71) Applicant: SAMSUNG ELECTRONICS CO., LTD., Suwon-si (KR)

(72) Inventors: Yongjin Kwon, Suwon-si (KR); Taeyang Song, Suwon-si (KR); Sungho Ahn, Suwon-si (KR); Wonho Lee, Suwon-si (KR); Jonghwa Lee, Suwon-si (KR); Nakhyun Choi, Suwon-si (KR); Junyoung Choi, Suwon-si (KR); Yangwook Kim, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 18/312,854

(22) Filed: May 5, 2023

(65) Prior Publication Data
US 2023/0273645 A1 Aug. 31, 2023

Related U.S. Application Data

(63) Continuation of application No. PCT/KR2021/013808, filed on Oct. 7, 2021.

(30) Foreign Application Priority Data

Nov. 17, 2020 (KR) .................. 10-2020-0153938
Jan. 8, 2021 (KR) .................. 10-2021-0002852

(51) Int. Cl.
*G06F 1/16* (2006.01)
*G06F 3/04845* (2022.01)
*H04M 1/02* (2006.01)

(52) U.S. Cl.
CPC .......... *G06F 1/1652* (2013.01); *G06F 1/1624* (2013.01); *G06F 3/04845* (2013.01); *H04M 1/0239* (2013.01); *H04M 1/0268* (2013.01)

(58) Field of Classification Search
CPC .... G06F 1/1652; G06F 1/1624; G06F 1/1694; G06F 1/1677; G06F 3/04845;
(Continued)

(56) References Cited

U.S. PATENT DOCUMENTS 9,383,916 B2 7/2016 Srinivasan et al.
9,619,197 B2 4/2017 Bang et al.
(Continued)

FOREIGN PATENT DOCUMENTS

CN 107316567 A 11/2017
JP 2013046318 A 3/2013
(Continued)

OTHER PUBLICATIONS

International Search Report for PCT/KR2021/013808 mailed Feb. 7, 2022, 2 pages.
(Continued)

*Primary Examiner* — Prabodh M Dharia
(74) *Attorney, Agent, or Firm* — Nixon & Vanderhye, P.C.

(57) ABSTRACT

An example electronic device includes a first housing, a second housing connected with the first housing and configured to perform a sliding operation, a driving device that adjusts the sliding operation, a flexible display, at least one sensor, and at least one processor. The processor is configured to control the electronic device to display content via at least a portion of a first area of the flexible display, identify an aspect ratio of the content, obtain orientation information of the electronic device using the sensor, and identify size information of a second area of the flexible display capable (Continued)

of maximally displaying the content with the identified aspect ratio of the content based on the obtained orientation information, the first area and the second area being one surface of an exposed area of the flexible display, and the second area being an area extended or reduced from the first area.

18 Claims, 20 Drawing Sheets

(58) Field of Classification Search
CPC ........ G06F 3/0487; G06F 3/0488; G06F 9/30; G06F 2200/1614; G06F 2200/1637; G06F 2203/04806; H04M 1/0239; H04M 1/0268; H04M 1/0241; H04M 1/72454
USPC ...................... 345/1.3, 173, 659; 361/679.04
See application file for complete search history.

(56) References Cited

U.S. PATENT DOCUMENTS

| | | | |
|---|---|---|---|
| 9,860,474 B2 | 1/2018 | Park et al. | |
| 9,904,501 B2* | 2/2018 | Becze | G06F 3/04817 |
| 10,007,328 B2 | 6/2018 | Lee et al. | |
| 10,037,593 B2 | 7/2018 | Srinivasan et al. | |
| 10,949,160 B2 | 3/2021 | Lee | |
| 11,164,544 B2 | 11/2021 | Yun | |
| 11,170,737 B2 | 11/2021 | Chen et al. | |
| 11,310,458 B2 | 4/2022 | Park et al. | |
| 2007/0247798 A1* | 10/2007 | Scott | G06F 1/1647 |
| | | | 361/679.04 |
| 2013/0044409 A1* | 2/2013 | Pegg | H04M 1/0225 |
| | | | 361/679.01 |
| 2015/0262331 A1* | 9/2015 | Bang | G06F 3/1446 |
| | | | 345/1.3 |
| 2016/0124497 A1* | 5/2016 | Lee | G06T 3/40 |
| | | | 345/173 |
| 2017/0150059 A1* | 5/2017 | Hattar | G06F 1/1618 |
| 2017/0212607 A1* | 7/2017 | Yoon | G06F 3/147 |
| 2018/0011597 A1* | 1/2018 | Lee | G06F 3/04842 |
| 2018/0115741 A1* | 4/2018 | Greene | H04N 21/4755 |
| 2020/0175945 A1* | 6/2020 | Chen | G09G 5/14 |
| 2020/0310738 A1* | 10/2020 | Lee | G09G 5/005 |
| 2022/0013086 A1 | 1/2022 | Yun | |
| 2022/0083148 A1 | 3/2022 | Chen et al. | |

FOREIGN PATENT DOCUMENTS

| | | | |
|---|---|---|---|
| KR | 20120091045 A | 8/2012 | |
| KR | 20130015542 A | 2/2013 | |
| KR | 20140144029 A | 12/2014 | |
| KR | 20150106211 A | 9/2015 | |
| KR | 20160050682 A | 5/2016 | |
| KR | 20170062121 A | 6/2017 | |
| KR | 20180128261 A | 12/2018 | |
| KR | 20190079357 A | 7/2019 | |
| KR | 20190142361 A | 12/2019 | |
| KR | 20200075809 A | 6/2020 | |
| KR | 20200113521 A | 10/2020 | |
| KR | 20200128493 A | 11/2020 | |

OTHER PUBLICATIONS

Written Opinion of the ISA for PCT/KR2021/013808 mailed Feb. 7, 2022, 4 pages.

Office Action dated Mar. 28, 2025 in Korean Application No. 10-2021-0002852 and English-language translation.

* cited by examiner

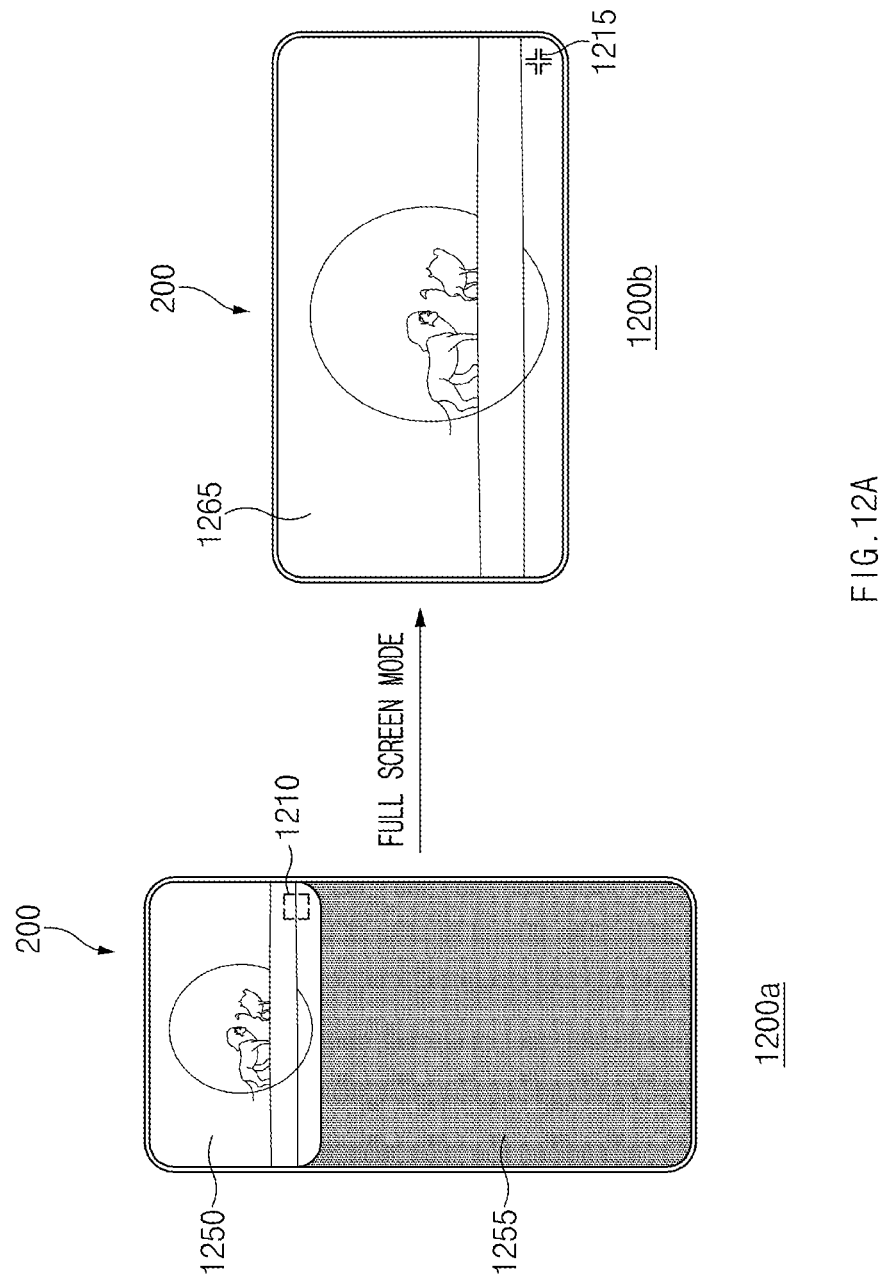

1215    1210    1217

1220    1222    1224

1230    1222    1235

ELECTRONIC DEVICE COMPRISING FLEXIBLE DISPLAY AND OPERATING METHOD THEREOF

CROSS-REFERENCE TO RELATED APPLICATIONS

This application is a continuation of International Application No. PCT/KR2021/013808, designating the United States, filed on Oct. 7, 2021, in the Korean Intellectual Property Receiving Office and claiming priority to Korean Patent Application No. 10-2020-0153938, filed Nov. 17, 2020, in the Korean Intellectual Property Office and to Korean Patent Application No. 10-2021-0002852, filed Jan. 8, 2021, in the Korean Intellectual Property Office. The disclosures of each of these applications are incorporated by reference herein in their entireties.

BACKGROUND

Field

The disclosure relates to an electronic device including a flexible display and a method for operating the same.

Description of Related Art

An electronic device may display content via a display. When an aspect ratio of the content and an aspect ratio of the display are different from each other, the content may be displayed in a partial area of the display. The remaining area of the display in which the content is not displayed may be referred to as a letter box.

SUMMARY

A letter box (a letter box area) of a display may hinder a sense of immersion of a user. Accordingly, a method for minimizing the letter box may be required.

In various example embodiments, a method for displaying content based on a state (e.g., a reduced state or an extended state) of an electronic device including a flexible display, and a method for changing the state of the electronic device based on the content being displayed are disclosed.

An electronic device according to an embodiment may include a first housing, a second housing fastened with the first housing and configured to perform a sliding operation, a driving device configured to adjust the sliding operation, a flexible display whose area visually exposed on a front surface of the electronic device changes in size in response to the sliding operation of the second housing, at least one sensor, a processor, and a memory storing instructions, the instructions, when executed by the processor, cause the electronic device to display content via at least a portion of a first area of the flexible display, identify an aspect ratio of the content, obtain orientation information of the electronic device using the at least one sensor, and identify size information of a second area of the flexible display capable of maximally displaying the content with the identified aspect ratio of the content based on the obtained orientation information, the first area and the second area being one surface of the exposed area of the flexible display, and the second area being an area extended or reduced from the first area.

A method for operating an electronic device according to an example embodiment may include displaying content via at least a portion of a first area of a flexible display, identifying an aspect ratio of the content, obtaining orientation information of the electronic device, and identifying size information of a second area of the flexible display capable of maximally displaying the content with the identified aspect ratio of the content based on the obtained orientation information, the first area and the second area being one surface of an exposed area of the flexible display, and the second area being an area extended or reduced from the first area.

The technical solutions achieved in the various example embodiments of the disclosure are not limited to the technical advantages mentioned above, and other technical advantages not mentioned may be clearly understood from the description below.

According to example embodiments, an electronic device may provide an optimal full screen mode by adjusting the exposed area of the flexible display and the display direction of the content.

According to example embodiments disclosed in the disclosure, the electronic device may reflect the user's preference by providing various user interfaces (UIs) related to the full screen mode.

In addition, various effects identified directly or indirectly via the disclosure may be provided.

Effects obtainable from various example embodiments of the disclosure are not be limited to the effects mentioned above, and other effects not mentioned may be clearly understood from the description below.

BRIEF DESCRIPTION OF THE DRAWINGS

The above and/or other aspects of the disclosure will be more apparent by describing certain embodiments of the disclosure with reference to the accompanying drawings, in which:

FIG. 12A illustrates an example UI for providing a full screen according to various embodiments;

With regard to the description of the drawings, the same or similar reference numerals may be used for the same or similar components.

DETAILED DESCRIPTION

Figure 1:
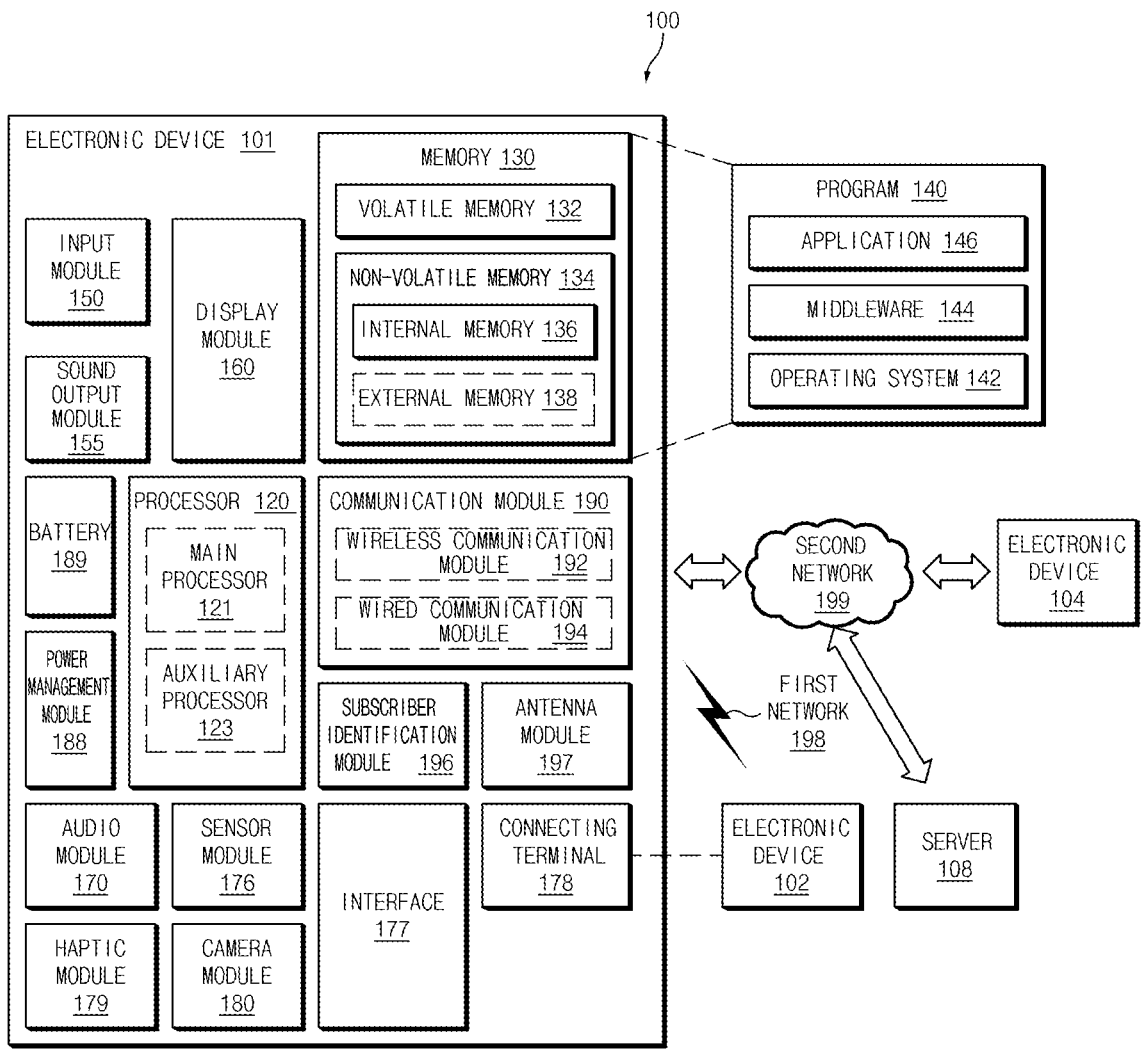
FIG. 1 is a block diagram of an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
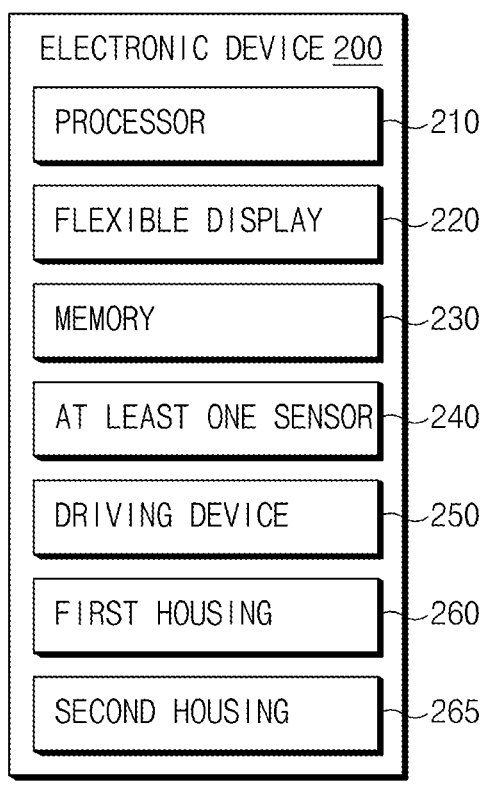
FIG. 2 shows a configuration of an example electronic device according to various embodiments.

FIG. 2 shows a configuration of an example electronic device according to various embodiments.

According to an embodiment, an electronic device 200 (e.g., the electronic device 101 in FIG. 1) may include a processor 210, a flexible display 220, a memory 230, at least one sensor 240, a driving device 250, a first housing 260, and/or a second housing 265. The electronic device 200 shown in FIG. 2 may further include at least some of the components of the electronic device 101 in FIG. 1. For example, the electronic device 200 may further include the battery 189 in FIG. 1.

According to an embodiment, the processor 210 (including, e.g., processing circuitry), the flexible display 220, the memory 230, or the at least one sensor 240 may correspond to the processor 120, the display module 160, the memory 130, or the sensor module 176 in FIG. 1, respectively.

The flexible display 220 may include at least partially flexible area. According to an embodiment, the flexible display 220 may be implemented in at least one form of a slidable display, a foldable display, or a rollable display. Hereinafter, it is assumed that the flexible display 220 is the slidable display, although the disclosure is not limited in this respect.

In an embodiment, the first housing 260 and the second housing 265 may form an outer appearance of the electronic device 200. The components (e.g., the flexible display 220, the memory 230, and the at least one sensor 240) included in the electronic device 200 may be disposed in a space defined by the first housing 260 and the second housing 265. The second housing 265 may be fastened with (or secured to) the first housing 260 and slide. The sliding operation of the second housing 265 may be adjusted by the driving device 250 (including, e.g., a motor). A shape of the electronic device 200 may change based on the sliding operation of the second housing 265. According to an embodiment, when a size of the electronic device 200 is extended to a maximum by the sliding operation of the second housing 265, the shape of the electronic device 200 may, for example, be referred to as an unrolled state. When the size of the electronic device 200 is reduced to a minimum by the sliding operation of the second housing 265, the shape of the electronic device 200 may, for example, be referred to as a rolled state.

According to an embodiment, the flexible display 220 may be divided into at least two areas. The flexible display 220 may be divided into an exposed area and a non-exposed area. According to an embodiment, the exposed area and the non-exposed area of the flexible display 220 may be adjusted by an external force (e.g., power by the driving device 250). According to an embodiment, the exposed area of the flexible display 220 may be extended or reduced.

For example, a state change (e.g., the extension or the reduction) of the flexible display 220 of the electronic device 200 may be manually performed by a user or automatically performed by a driving mechanism (e.g., the driving device 250, a driving motor, a reduction gear module, and/or a gear assembly) disposed inside the electronic device 200.

According to an embodiment, the driving mechanism may be triggered based on a user input. According to an embodiment, the user input for triggering an operation of the driving mechanism may include a touch input via the flexible display 220, a force touch input, and/or a gesture input. For example, when a specified signal is generated from various sensors such as a pressure sensor, the flexible display 220 may be changed from the reduced state to the extended state or from the extended state to the reduced state.

According to an embodiment, when the user carries or grips the electronic device 200, the electronic device 200 may sense a squeeze gesture using the sensor. The squeeze gesture may be an operation in which the user presses a specified area of the electronic device 200 with a portion of a hand (e.g., a palm of the hand or a finger). In response to the squeeze gesture, the state of the flexible display 220 of the electronic device 200 may be switched from the reduced state to the extended state or from the extended state to the reduced state.

In an embodiment, the user input for triggering the operation of the driving mechanism may include a voice input or an input to a button visually exposed to the outside of the electronic device 200. For example, when a user input via a hardware button (e.g., a physical button) or a software button provided via a screen is sensed, the state of the display 220 of the electronic device 200 may be switched from the reduced state to the extended state or from the extended state to the reduced state.

According to an embodiment, the exposed area may correspond to at least one surface. For example, a portion of the exposed area may correspond to a front surface (e.g., a +Z axis direction in FIGS. 3A and 3B) of the electronic device 200. A portion of the exposed area may correspond to a side surface (e.g., a +X axis direction in FIGS. 3A and 3B) of the electronic device 200.

According to an embodiment, the processor 210 may display content via one surface of the exposed area (e.g., a surface corresponding to the front surface of the electronic device 200). In addition, the processor 210 may display content via another surface of the exposed area (e.g., a surface corresponding to the side surface of the electronic device 200). The contents displayed on one surface and the other surface of the exposed area may be different from each other. According to an embodiment, the processor 210 may display one content via all surfaces of the exposed area. Hereinafter, for convenience of description, the content displayed on the one surface of the exposed area corresponding to the front surface of the electronic device 200 will be mainly described.

According to an embodiment, the flexible display 220 may display an image object (e.g., the content) via the one surface of the exposed area. According to an embodiment, at least a portion of the one surface of the exposed area on which the image object is displayed may be referred to as a display area. According to an embodiment, a size of the display area may be equal to a size of the one surface of the exposed area. According to an embodiment, the size of the display area may be smaller than the size of the one surface of the exposed area. An area other than the display area on the one surface of the exposed area may be referred to as a letter box.

According to an embodiment, the non-exposed area of the flexible display 220 may be an area covered by at least a portion of the first housing 260 and the second housing 265 of the electronic device 200. The non-exposed area of the flexible display 220 may be an area that cannot be visually identified by the user.

The memory 230 may, for example, store reference screen information of the flexible display 220. According to an embodiment, the reference screen information may include information about a size of the exposed area based on the shape of the electronic device 200. For example, the reference screen information may include size information of the exposed area when the electronic device 200 is in the rolled state and size information of the exposed area when the electronic device 200 is in the unrolled state.

According to an embodiment, the at least one sensor 240 (e.g., the sensor module 176 in FIG. 1) may sense rotation of the electronic device 200. According to an embodiment, the at least one sensor 240 may sense the shape change of the electronic device 200. For example, the at least one sensor 240 may be an accelerometer, a gyro sensor (gyroscope), a magnetic sensor, a hall sensor, an angle encoder, a stretch sensor, a proximity sensor, a rotary sensor, a piezo sensor, a touch panel sensor, or a pressure sensor. Such sensors are only examples, and the at least one sensor 240 may further include at least one other type of sensor.

According to an embodiment, the magnetic sensor and the hall sensor may include a transmitter for generating a magnetic field of a specific frequency and a receiver for receiving the magnetic field generated by the transmitter. The processor 210 may obtain state information (e.g., the size of the exposed area) of the flexible display 220 using the magnetic sensor and the hall sensor.

According to an embodiment, the stretch sensor may be disposed inside the housing of the electronic device 200 and may be stretchable based on the state change (e.g., the extension or the reduction) of the flexible display 220. The processor 210 may obtain the state information (e.g., the size of the exposed area) of the flexible display 220 using the stretch sensor.

The driving device 250 may be set to adjust the exposed area of the flexible display 220. For example, the driving device 250 may adjust the sliding operation of the second housing. According to an embodiment, the driving device 250 may include a power device (e.g., the driving motor and an actuator) for adjusting the exposed area of the flexible display 220.

In an embodiment, the at least one sensor 240 may include at least one of the accelerometer, the gyro sensor, and a geomagnetic sensor (the magnetic sensor). The processor 210 may detect an inclined angle of the electronic device 200 with respect to a ground surface and/or a direction the electronic device 200 faces in a three-dimensional coordinate system using sensing data obtained from at least one of those sensors. However, an example of the at least one sensor 240 may not be limited thereto, and various sensors capable of obtaining information about the inclined angle and/or a rotation direction of the electronic device 200 may be used. For example, the accelerometer may sense information about a linear motion of the electronic device 200 and/or an acceleration of the electronic device 200 with respect to three axes. The gyro sensor may sense information related to the rotation of the electronic device 200, and the geomagnetic sensor may sense information about the direction the electronic device 200 faces in an absolute coordinate system.

Figure 3A:
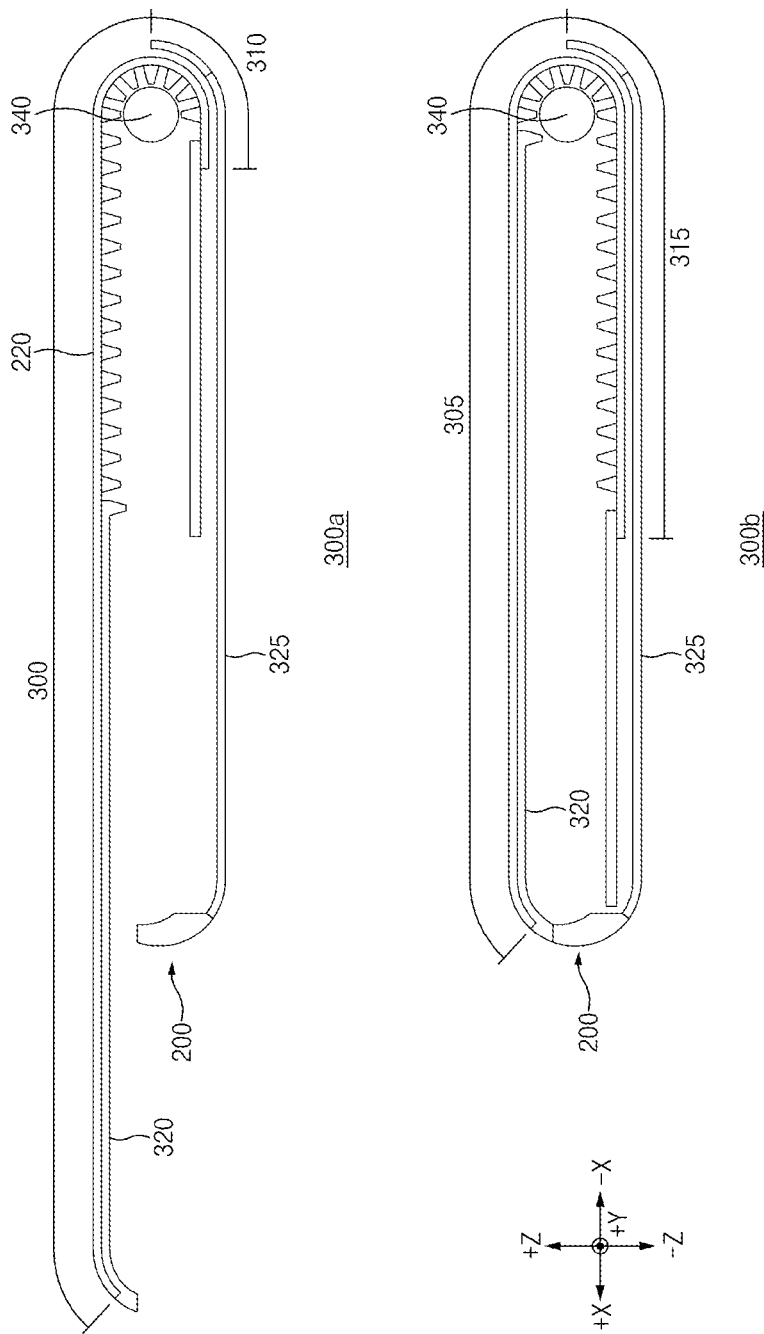
FIG. 3A shows a structure of an example electronic device according to various embodiments.

FIG. 3A shows a structure of an example electronic device according to various embodiments.

An electronic device (e.g., the electronic device 200 in FIG. 2) may be in one of an unrolled state 300a, a rolled state 300b, or an intermediate state between the unrolled state 300a and the rolled state 300b.

In the unrolled state 300a, a flexible display (e.g., the flexible display 220 in FIG. 2) may be divided into an exposed area 300 and a non-exposed area 310. In the rolled state 300b, the flexible display 220 may be divided into an exposed area 305 and a non-exposed area 315.

According to an embodiment, based on a structure of a first housing 320, a larger portion of the flexible display 220 may be exposed, unlike shown in FIG. 3A. For example, when a portion of the first housing 320 corresponding to the non-exposed area 310 is removed in the unrolled state 300a, the non-exposed area 310 may be included in the exposed area. In this case, at least a portion of the exposed area (e.g., the non-exposed area 310) may also correspond to a rear surface (a −Z axis direction) of the electronic device 200.

According to an embodiment, the flexible display 220 may be supported by the first housing 320 and a second housing 325. The first housing 320 and the second housing 325 may be coupled to each other to define a space in which other components (e.g., the flexible display 220, the memory 230, the at least one sensor 240, and the driving device 250 in FIG. 2) of the electronic device 200 may be disposed.

According to an embodiment, the state of the electronic device 200 may vary based on a rolling shaft 340. For example, the sliding operation of the second housing 325 may be performed by rotation of the rolling shaft 340. Based on the state change of the electronic device 200, sizes of the exposed areas 300 and 305 and the non-exposed areas 310 and 315 may vary.

According to an embodiment, when the rolling shaft 340 rotates in a first rotation direction (e.g., a clockwise direction) in the unrolled state 300a, the size of the exposed area 300 may be reduced so as to be equal to that of the exposed area 305. The size of the non-exposed area 310 may increase so as to be equal to that of the non-exposed area 315.

According to an embodiment, when the rolling shaft 340 rotates in a second rotation direction (e.g., a counterclockwise direction) in the rolled state 300b, the size of the exposed area 305 may increase so as to be equal to that of the exposed area 300. The size of the non-exposed area 315 may be reduced so as to be equal to that of the non-exposed area 310.

According to an embodiment, the rotation of the rolling shaft 340 may be controlled by the driving device (e.g., the driving device 250 in FIG. 2).

In an embodiment, the electronic device 200 may include at least one resilient structure (not shown). When the flexible display 220 is moved by a predetermined distance by the external force, the state of the flexible display 220 may be switched from the reduced state to the extended state or from the extended state to the reduced state without any further external force because of the at least one resilient structure. For example, the at least one resilient structure may be implemented based on various resilient members (e.g., a torsion spring).

Figure 3B:
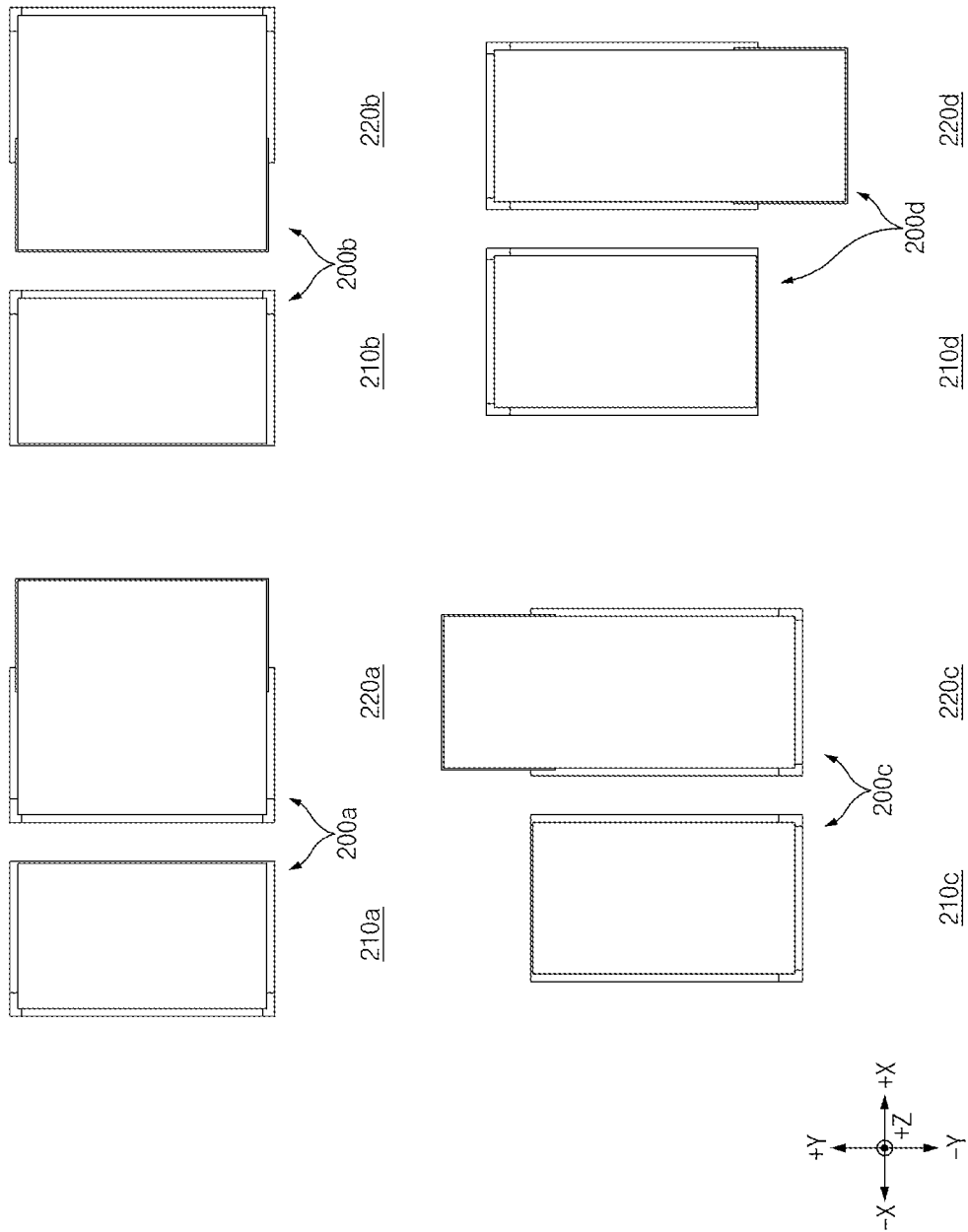
FIG. 3B shows an example electronic device that is extended or reduced in various directions according to various embodiments.

FIG. 3B shows an example electronic device that is extended or reduced in various directions according to various embodiments.

According to various embodiments, electronic devices 200a, 200b, 200c, and 200d (e.g., the electronic device 200 in FIG. 2) may include a first housing (e.g., the first housing 260 in FIG. 2) and a second housing (e.g., the second housing 265 in FIG. 2). According to an embodiment, the electronic device 200 may be extended or contracted based on a sliding direction of the second housing 265.

According to an embodiment, the second housing 265 of the electronic device 200a may slide along an X axis. According to an embodiment, a first shape 210a of the electronic device 200a is obtained as the second housing 265 slides in the −X axis direction and a size of the electronic device 200a is reduced to the minimum. According to an embodiment, a second shape 220a of the electronic device 200a is obtained as the second housing 265 slides in the +X axis direction and the size of the electronic device 200a is extended to the maximum. The exposed area of the flexible display 220 may be minimum in the first shape 210a and maximum in the second shape 220a.

According to an embodiment, the second housing 265 of the electronic device 200b may slide along the X axis. According to an embodiment, a first shape 210b of the electronic device 200b is obtained as the second housing 265 slides in +X axis direction and a size of the electronic device 200b is reduced to the minimum. According to an embodiment, a second shape 220b of the electronic device 200b is obtained as the second housing 265 slides in the −X axis direction and the size of the electronic device 200b is extended to the maximum. The exposed area of the flexible display 220 may be minimum in the first shape 210b and maximum in the second shape 220b.

According to an embodiment, the second housing 265 of the electronic device 200c may slide along a Y axis. According to an embodiment, a first shape 210c of the electronic device 200c is obtained as the second housing 265 slides in a −Y axis direction and a size of the electronic device 200c is reduced to the minimum. According to an embodiment, a second shape 220c of the electronic device 200c is obtained as the second housing 265 slides in a +Y axis direction and the size of the electronic device 200c is extended to the maximum. The exposed area of the flexible display 220 may be minimum in the first shape 210c and maximum in the second shape 220c.

According to an embodiment, the second housing 265 of the electronic device 200d may slide along the Y axis. According to an embodiment, a first shape 210d of the electronic device 200d is obtained as the second housing 265 slides in the +Y axis direction and a size of the electronic device 200d is reduced to the minimum. According to an embodiment, a second shape 220d of the electronic device 200d is obtained as the second housing 265 slides in the −Y axis direction and the size of the electronic device 200d is extended to the maximum. The exposed area of the flexible display 220 may be minimum in the first shape 210d and maximum in the second shape 220d.

In an embodiment, the first shape may, for example, be referred to as a first form or a first state, and the second shape may be referred to, for example, as a second form or a second state. For example, the first shape may, for example, include a normal state, the reduced state, a closed state, the unrolled state, or a slide-in state, and the second shape may, for example, include the extended state, an open state, the rolled state, or a slide-out state. In addition, in an embodiment, the electronic devices 200a, 200b, 200c, and 200d may form a third shape that is a state between the first shape and the second shape. For example, the third shape may be referred to as a third form or a third state, and may include a free stop state.

The shape changes of the electronic devices 200a, 200b, 200c, and 200d shown in FIG. 3B are only examples, and the embodiments of the disclosure are not limited thereto. According to an embodiment, the electronic device may be extended or contracted in at least two directions (e.g., the X axis and the −X axis, or the Y axis and the −Y axis).

Figure 4:
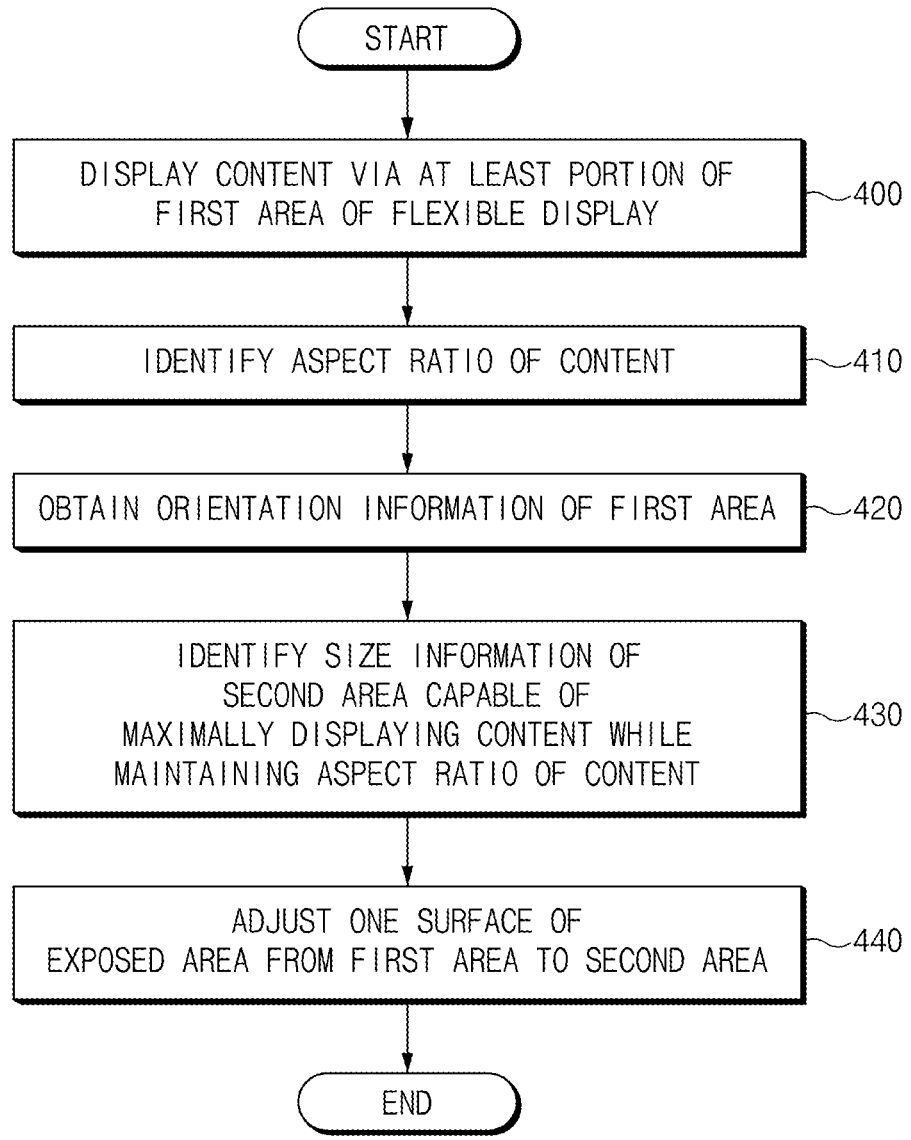
FIG. 4 is a flowchart illustrating an example full screen mode providing operation of an example electronic device according to various embodiments.

FIG. 4 is a flowchart illustrating an example operation of providing a full screen mode of an electronic device according to various embodiments.

Referring to operation 400, a processor (e.g., the processor 210 in FIG. 2) may display the content via at least a portion of a first area of a flexible display (e.g., the flexible display 220 in FIG. 2). For example, the first area of the flexible display 220 may be the one surface of the exposed area corresponding to the front surface (e.g., the +Z axis direction in FIG. 3B) of the electronic device 200. An area where the content is displayed in the first area may, for example, be referred to as the display area. An area where the content is not displayed in the first area may, for example, be referred to as the letter box.

According to an embodiment, the letter box may or may not appear depending on a relationship between aspect ratios of the first area and the content. For example, when the aspect ratio of the first area is different from that of the content, the letter box may appear. For example, when the aspect ratio of the first area is the same as that of the content, the letter box may not appear.

Referring to operation 410, the processor 210 may identify the aspect ratio of the content. The content may, for example, include a video and/or an image having a fixed aspect ratio. The aspect ratio may be a value obtained by dividing a height by a width. In addition, the aspect ratio may, for example, refer to a horizontal to vertical ratio or a width to height ratio. For example, the aspect ratio may be defined as a horizontal/vertical or vertical/horizontal ratio, and may be defined as a landscape type or a portrait type. In the disclosure, for convenience of description, a description will be made by defining the aspect ratio as the value obtained by dividing the height by the width.

According to an embodiment, the aspect ratio of the content may be an intrinsic ratio of the content. According to an embodiment, the aspect ratio of the content may be the intrinsic ratio before the size of the content is adjusted. Alternatively, the processor 210 may adjust the size of the electronic device 200 by extending or contracting both sides of the flexible display 220 in different directions (e.g., the +X axis and the −X axis or the +Y axis and the −Y axis in FIG. 3B) using a driving device (e.g., the driving device 250 in FIG. 2).

In operation 420, the processor 210 may obtain orientation information of the first area. The processor 210 may identify orientation of the first area based on the display direction of the content.

According to an embodiment, the processor 210 may identify the aspect ratio of the first area based on an upper end of the content displayed via the first area. For example, one axis of the first area in contact with the upper end of the content may be used as a reference axis. The processor 210 may calculate the aspect ratio of the first area by taking the width as the reference axis and the height as an axis substantially perpendicular to the reference axis. When the aspect ratio of the first area is greater than 1, the processor 210 may identify the orientation of the first area as the portrait type. When the aspect ratio of the first area is smaller than 1, the processor 210 may identify the orientation of the first area as the landscape type. In an embodiment, when the aspect ratio is 1, the processor 210 may identify the orientation of the first area as at least one of the landscape type and the portrait type. For example, when the aspect ratio is 1, the processor 210 may identify that the orientation of the first area is the same as orientation of the content.

According to an embodiment, the display direction of the content may be preset by the user input. For example, the user may set the exposed area of the flexible display 220 suitable for a user's preference, and the processor 210 may reset the display direction of the content based on the setting. According to an embodiment, when displaying the content on the flexible display 220, the processor 210 may set the display direction of the content set by the user as a default, and display the content based on the display direction of the content.

In operation 430, the processor 210 may identify size information of a second area capable of maximally displaying the content while maintaining the aspect ratio of the content. For example, the second area may be the one surface of the exposed area corresponding to the front surface (the +Z axis direction) of the electronic device 200. The second area may be an area extended or reduced from the first area.

In operation 440, the processor 210 may adjust the one surface of the exposed area (e.g., the portion of the exposed area corresponding to the front surface of the electronic device 200) from the first area to the second area.

According to an embodiment, the processor 210 may adjust the size of the exposed area by controlling the driving device (e.g., the driving device 250 in FIG. 2). The driving device 250 may adjust the size of the exposed area by sliding the second housing (e.g., the second housing 265 in FIG. 2) in one direction (e.g., the +X axis direction or the −X axis direction). A description of the sliding direction of the second housing 265 may refer to the description of FIG. 3B.

According to an embodiment, the processor 210 may identify the display direction of the content before adjusting the size of the exposed area. For example, the processor 210 may change or maintain the display direction of the content. The processor 210 may compare an aspect ratio of the second area with the aspect ratio of the content to determine whether to change the display direction of the content. A description of the identification of the display direction of the content may refer to a description of FIG. 7.

According to an embodiment, the processor 210 may provide the content in the second area. According to an embodiment, the processor 210 may adjust the size of content to correspond to a size of the second area. In this case, an entirety of the second area may be the display area. The letter box may not appear in the second area. According to an embodiment, the letter box may appear in the second area, but the size of the letter box appearing in the second area may be minimized because of the operations in FIG. 4.

Figure 5:
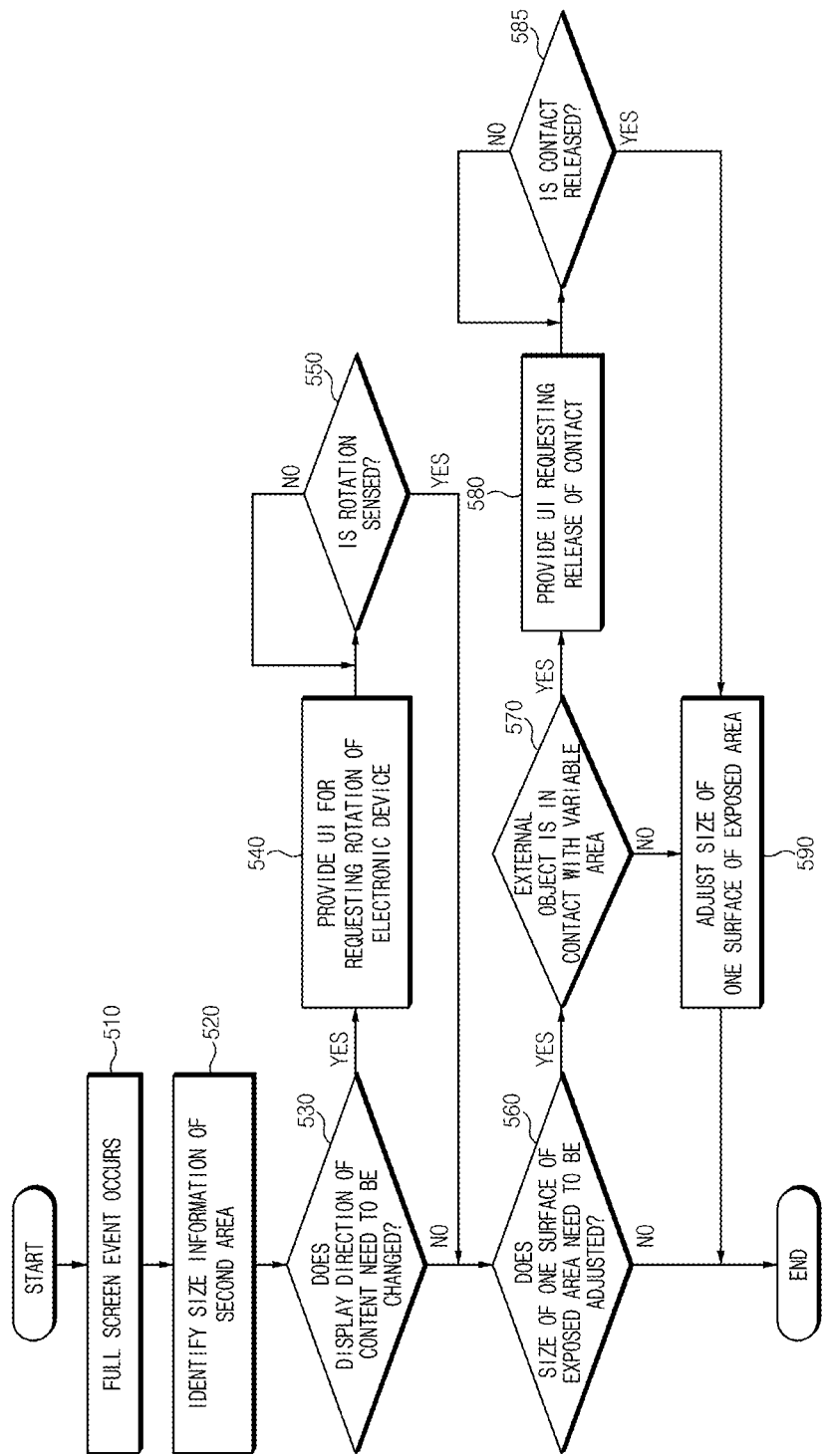
FIG. 5 is a flowchart illustrating an example full screen provision of an electronic device according to various embodiments.

FIG. 5 is a flowchart illustrating an example full screen provision of an electronic device according to various embodiments.

Referring to operation 510, a processor (e.g., the processor 210 in FIG. 2) may sense a full screen event. For example, the processor 210 may sense the full screen event based on the user input. According to an embodiment, the processor 210 may sense the full screen event based on a user input (e.g., a touch on a specified image object) identified via a user interface (UI). According to an embodiment, the UI may be displayed together on the content displayed in a first area of a flexible display (e.g., the flexible display 220 in FIG. 2). According to an embodiment, the UI may include the specified image object for requesting the full screen event of the content.

In an embodiment, the processor 210 may monitor and/or perform the full screen event based on a signal obtained from an external electronic device (e.g., the electronic devices 102 and 104 or the server 108 in FIG. 1). For example, the processor 210 may receive an output command of the content from the external electronic device and display, via the flexible display 220, the content stored in a memory (e.g., the memory 230 in FIG. 2) of the electronic device 200 based on the received command. According to an embodiment, the processor 210 may receive both the content and the output command of the content from the external electronic device. For example, the processor 210 may receive at least a portion of the content to be displayed via the flexible display 220 from the external electronic device. The processor 210 may display the content via the flexible display 220 based on the content output command when a data quantity of the received content is a specified numerical value (e.g., equal to or greater than about 10%) of a total data quantity. For example, the processor 210 may display the content using a streaming scheme.

Referring to operation 520, the processor 210 may identify size information of the second area. Operation 520 may correspond to operations 410 to 430 in FIG. 4. According to an embodiment, in the second area, the display area may be displayed in a maximum size and the letter box may be minimized or removed.

In an embodiment, the processor 210 may identify the size information of the second area based on an amount of the content obtained from the external electronic device, a data transmission rate, and/or a data quality (e.g., a quality of service (QoS)). For example, when the processor 210 receives the content (e.g., streaming content) from the external electronic device in the streaming scheme, the size information of the second area may be identified based on an amount of the streaming content received by the electronic device 200, a data transmission rate with the external electronic device, and/or a data quality. For example, the processor 210 may identify the size of the second area to correspond to a resolution of a second numerical value smaller than a first numerical value that is a resolution of the streaming content. Accordingly, other than a physical maximum and/or minimum size of the second area of the flexible display 220, the size information of the second area that does not cause visual heterogeneity (e.g., image deterioration) to the user may be identified.

Referring to operation 530, the processor 210 may determine whether the display direction of the content needs to be changed. According to an embodiment, the processor 210 may determine whether to change the display direction of the content based on reference screen information. For example, the reference screen information may include size information when the one surface of the exposed area of the flexible display 220 corresponding to the front surface (e.g., the +Z axis direction in FIG. 3B) of the electronic device 200 is maximum and size information when the one surface is minimum. The processor 210 may compare orientations of the electronic device 200 when the one surface of the exposed area is maximum and minimum with each other based on the reference screen information. The processor 210 may determine whether to change the display direction of the content based on the comparison result. A description of operation 530 may refer to the description of FIG. 7.

When the display direction of the content needs to be changed (530-YES), the processor 210 may proceed to operation 540. In operation 540, the processor 210 may provide a UI for requesting the rotation of the electronic device 200. In operation 550, the processor 210 may sense the rotation of the electronic device 200 using the at least one sensor 240. When the rotation of the electronic device 200 is not sensed (550-NO), the processor 210 may repeat operation 550. When the rotation of the electronic device 200 is sensed (550-YES), the processor 210 may proceed to operation 560.

When the display direction of the content does not need to be changed (530-NO), the processor 210 may proceed to operation 560.

In operation 560, the processor 210 may determine whether the size of the one surface of the exposed area (e.g., the portion of the exposed area corresponding to the front surface of the electronic device 200) needs to be adjusted. According to an embodiment, when the size of the second area is larger or smaller than the size of the first area, it may be necessary to adjust the size of the exposed area.

When the size of the one surface of the exposed area does not need to be adjusted (560-NO), the processor 210 may terminate the operation. In this case, the size of the first area may be equal to the size of the second area.

When the size of the one surface of the exposed area needs to be adjusted (560-YES), the processor 210 may proceed to operation 570. In operation 570, the processor 210 may determine whether an external object (e.g., a body part of the user) is in contact with a variable area. The processor 210 may identify the contact of the external object using the at least one sensor 240. The variable area may be one area of the flexible display 220 that may be extended or reduced based on the change in the shape of the electronic device 200.

When the contact of the external object with the variable area is identified (570-YES), the processor 210 may proceed to operation 580. In operation 580, the processor 210 may provide a UI requesting release of the contact with the variable area. In operation 585, the processor 210 may determine whether the contact of the external object with the variable area is released using the at least one sensor 240. When the contact of the external object is not released (585-NO), the processor 210 may repeat operation 585. When the contact of the external object is released (585-YES), the processor 210 may proceed to operation 590.

When the contact of the external object with the variable area is not identified (570-NO), the processor 210 may proceed to operation 590.

In operation 590, the processor 210 may adjust the size of the one surface of the exposed area based on the size information of the second area. According to an embodiment, the processor 210 may extend or reduce the size of the one surface of the exposed area to correspond to the size of the second area.

According to an embodiment, a series of operations related to operation 530 and a series of operations related to operation 560 may be performed in reverse order. For example, the processor 210 may adjust the size of the exposed area based on operation 560 and then change the display direction of the content based on operation 530. According to an embodiment, at least one of the series of operations related to operation 530 and the series of operations related to operation 560 may be omitted.

Figure 6A:
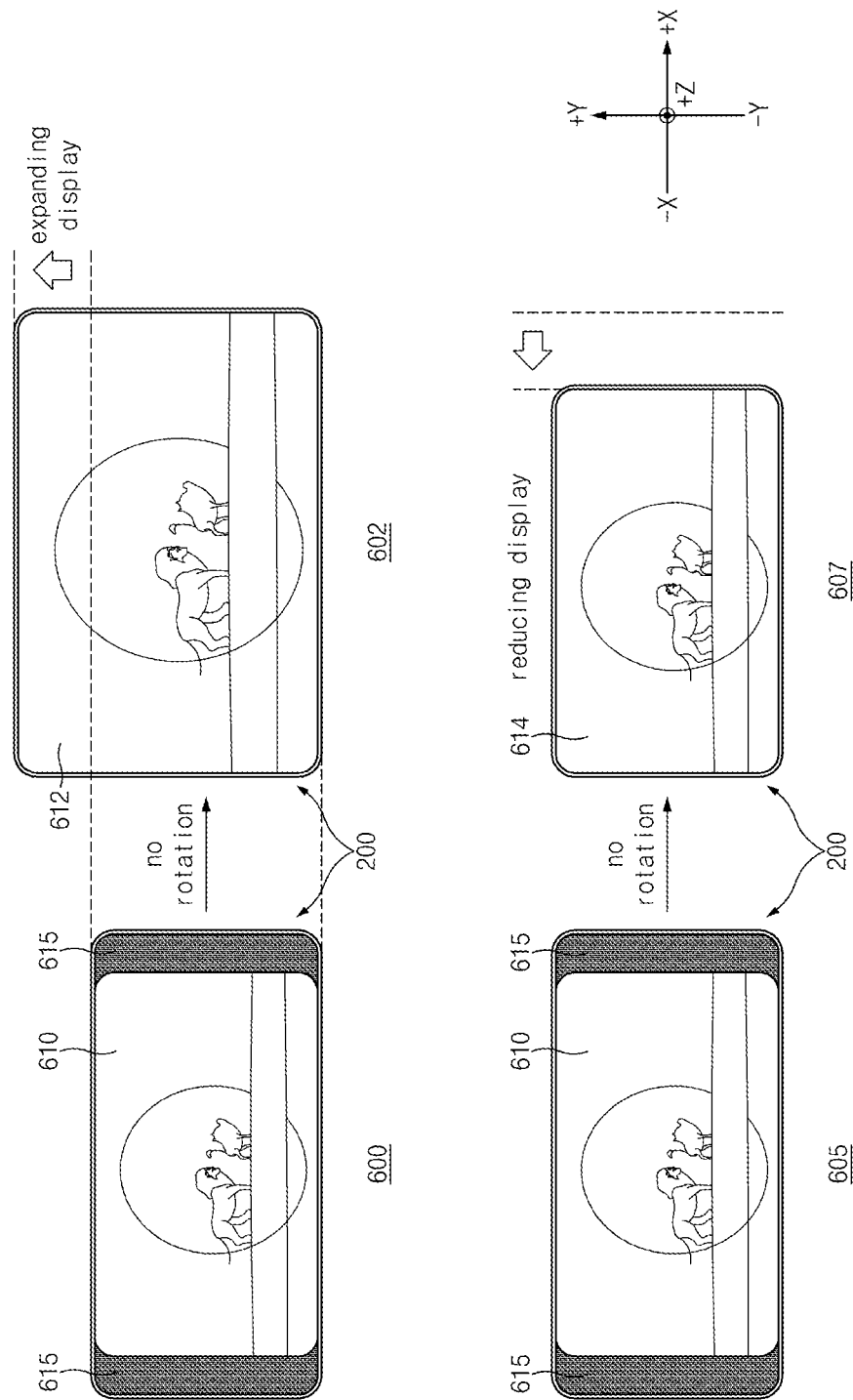
FIG. 6A illustrates an example full screen mode according to various embodiments.
Figure 6B:
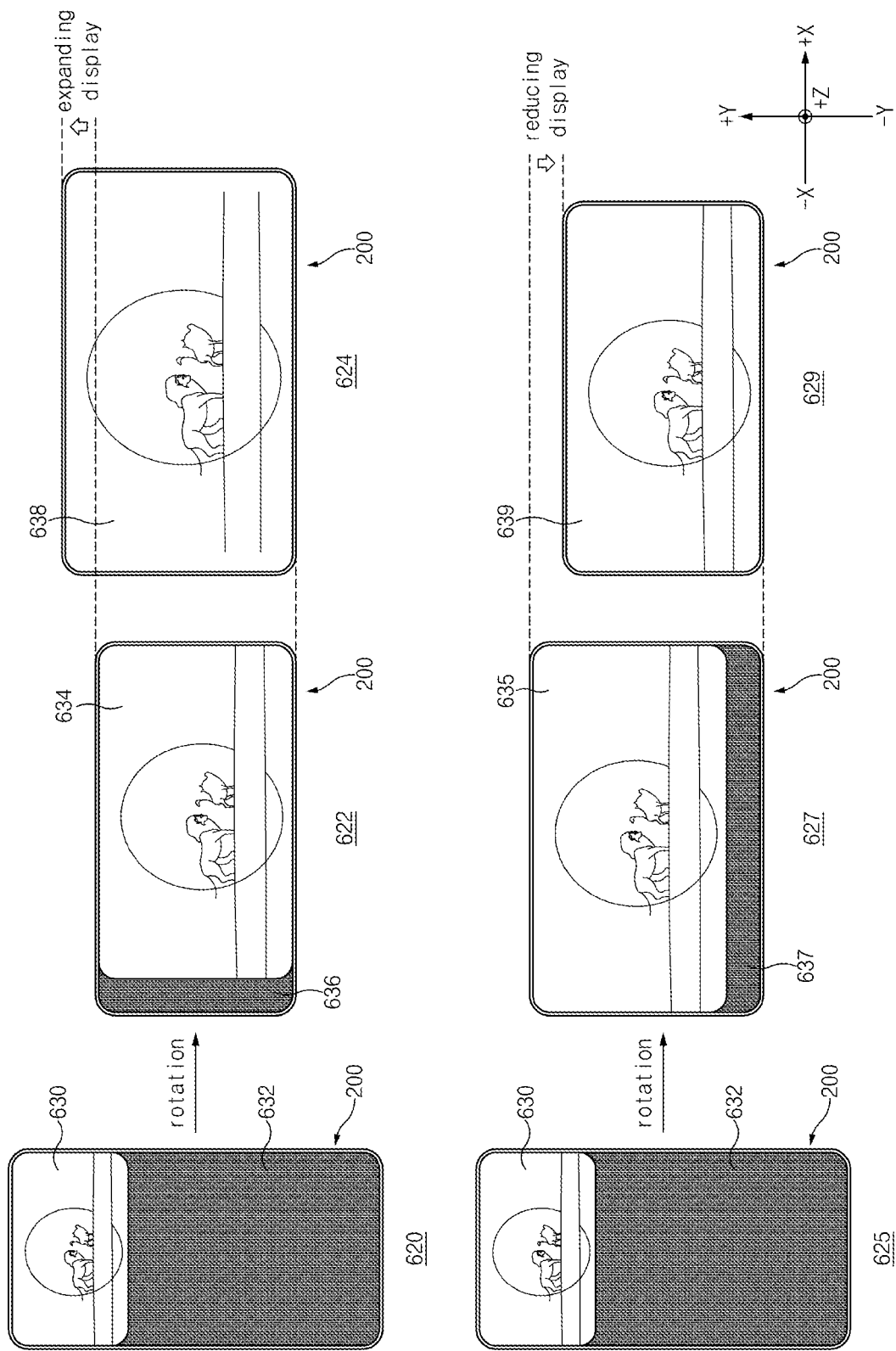
FIG. 6B illustrates an example full screen mode according to various embodiments.
Figure 6C:
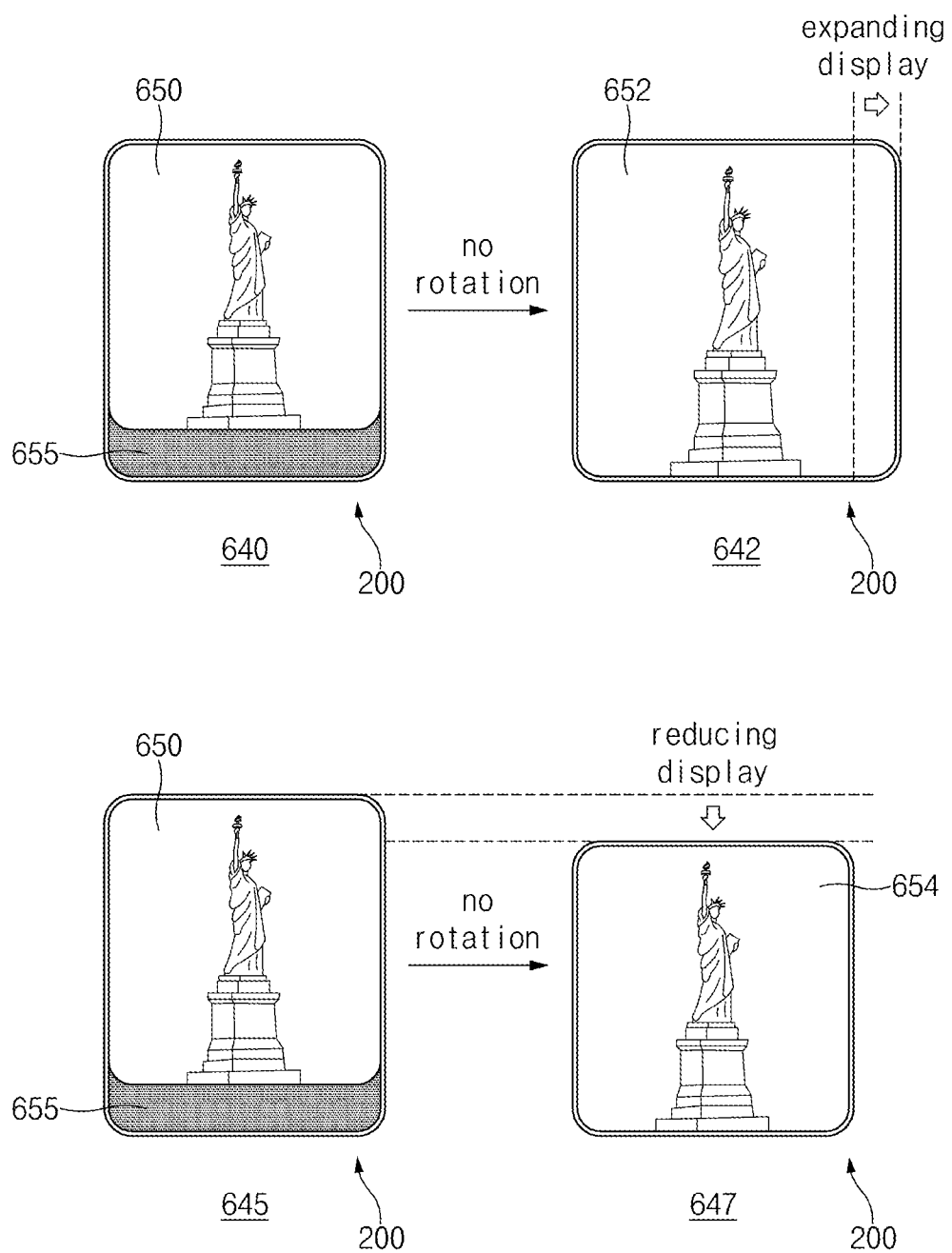
FIG. 6C illustrates an example full screen mode according to various embodiments.
Figure 6D:
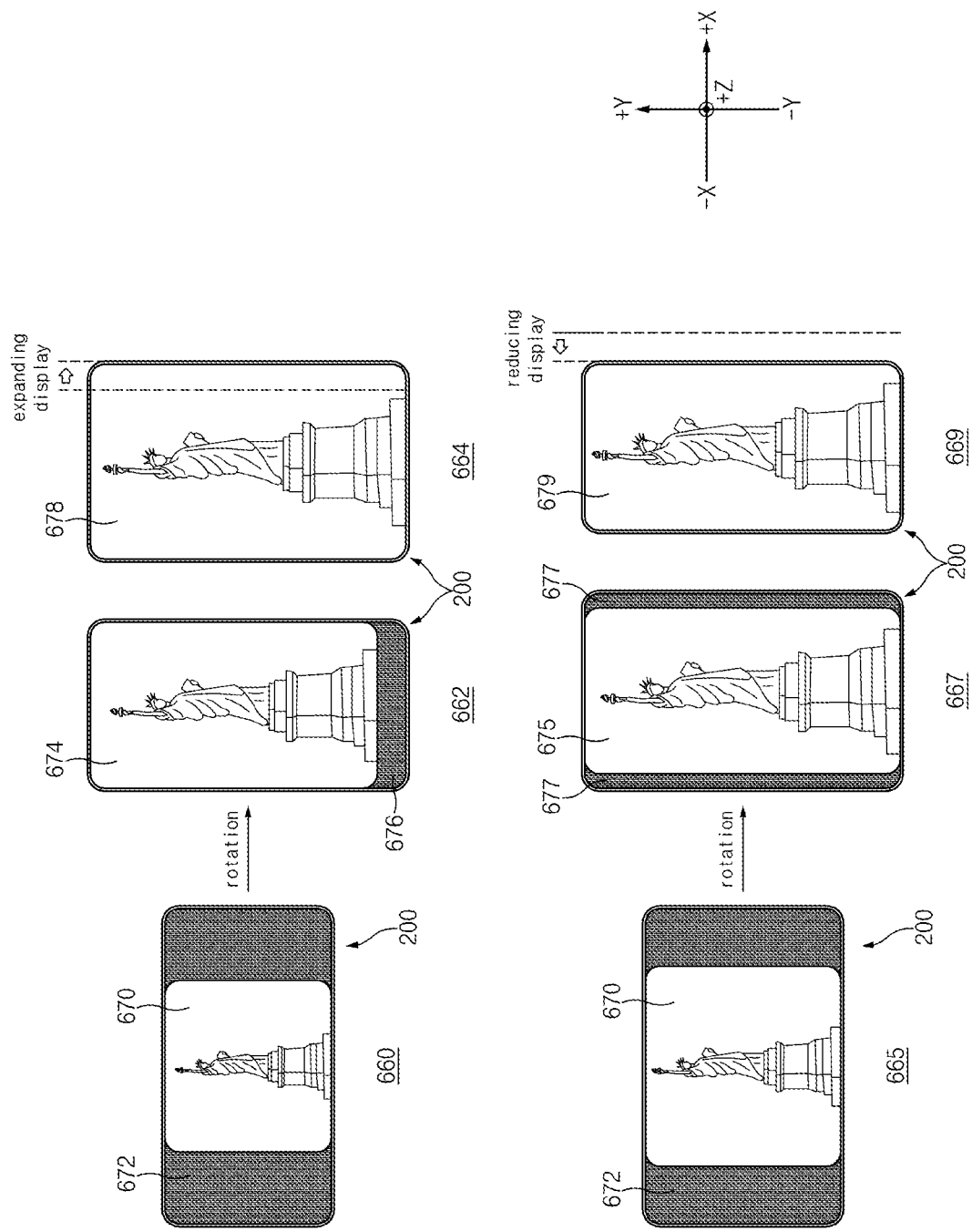
FIG. 6D illustrates an example full screen mode according to various embodiments.

FIG. 6A illustrates an example full screen mode according to various embodiments. FIG. 6B illustrates an example full screen mode according to various embodiments. FIG. 6C illustrates an example full screen mode according to various embodiments. FIG. 6D illustrates an example full screen mode according to various embodiments.

In FIG. 6A, a processor (e.g., the processor 210 in FIG. 2) may adjust a size of an exposed area of a flexible display (e.g., the flexible display 220 in FIG. 2) without changing the display direction of the content.

Referring to reference numeral 600, the first area of the flexible display 220 may be the portion of the exposed area corresponding to the front surface (the +Z axis direction) of the electronic device 200. The first area may include a display area 610 and a letter box 615. The content may be displayed in the display area 610 of the first area. The electronic device 200 may be a slidable electronic device that may be extended in the +Y axis direction. When the full screen event occurs, the processor 210 may identify the size information of the second area. The processor 210 may adjust the size of the exposed area by extending the electronic device 200 in the +Y axis direction using a driving device (e.g., 250 in FIG. 2). The processor 210 may adjust the size of the content so as to correspond to the size of the second area while maintaining the aspect ratio of the content in the second area. Referring to reference numeral 602, the entirety of the second area may be a display area 612. The processor 210 may provide the content in a full screen in the display area 612.

Referring to reference numeral 605, like reference numeral 600, the first area may include the display area 610 and the letter box 615. The electronic device 200 may be the slidable electronic device that may be reduced in the −X axis direction. When the full screen event occurs, the processor 210 may identify the size information of the second area. The processor 210 may adjust the size of the exposed area by reducing the electronic device 200 in the −X axis direction using a driving device (e.g., 250 in FIG. 2). The processor 210 may adjust the size of the content so as to correspond to the size of the second area while maintaining the aspect ratio of the content in the second area. Referring to reference numeral 607, the entirety of the second area may be a display area 614. The processor 210 may provide the content in the full screen in the display area 614.

In FIG. 6B, the processor 210 may adjust the size of the exposed area of the flexible display 220 after changing the display direction of the content.

Referring to reference numeral 620, the first area of the flexible display 220 may be the portion of the exposed area corresponding to the front surface (the +Z axis direction) of the electronic device 200. The first area may include a display area 630 and a letter box 632. The content may be displayed in the display area 630 of the first area. When the full screen event occurs, the processor 210 may identify the size information of the second area. The processor 210 may change the display direction of the content based on reference screen information (e.g., the reference screen information in FIG. 2). Referring to reference numeral 622, the first area may include a display area 634 and a letter box 636. The processor 210 may adjust the size of the exposed area by extending the electronic device 200 in the +Y axis direction using the driving device 250. The processor 210 may adjust the size of the content so as to correspond to the size of the second area while maintaining the aspect ratio of the content in the second area. Referring to reference numeral 624, the entirety of the second area may be a display area 638. The processor 210 may provide the content in the full screen in the display area 638.

Referring to reference numeral 625, like reference numeral 620, the first area may include the display area 630 and the letter box 632. When the full screen event occurs, the processor 210 may identify the size information of the second area. The processor 210 may change the display direction of the content based on the reference screen information. Referring to reference numeral 627, the first area may include a display area 635 and a letter box 637. The processor 210 may adjust the size of the exposed area by reducing the electronic device 200 in the −Y axis direction using the driving device 250. The processor 210 may adjust the size of the content so as to correspond to the size of the second area while maintaining the aspect ratio of the content in the second area. Referring to reference numeral 629, the entirety of the second area may be a display area 639. The processor 210 may provide the content in the full screen in the display area 639.

In FIG. 6C, the processor 210 may adjust the size of the exposed area of the flexible display 220 without changing the display direction of the content.

Referring to reference numeral 640, the first area of the flexible display 220 may be the portion of the exposed area corresponding to the front surface (the +Z axis direction) of the electronic device 200. The first area may include a display area 650 and a letter box 655. The content may be displayed in the display area 650 of the first area. The electronic device 200 may be the slidable electronic device that may be extended in the +X axis direction. When the full screen event occurs, the processor 210 may identify the size information of the second area. The processor 210 may adjust the size of the exposed area by extending the electronic device 200 in the +X axis direction using the driving device 250. The processor 210 may adjust the size of the content so as to correspond to the size of the second area while maintaining the aspect ratio of the content in the second area. Referring to reference numeral 642, the entirety of the second area may be a display area 652. The processor 210 may provide the content in the full screen in the display area 652.

Referring to reference numeral 645, like reference numeral 640, the first area may include the display area 650 and the letter box 655. The electronic device 200 may be the slidable electronic device that may be reduced in the −Y axis direction. When the full screen event occurs, the processor 210 may identify the size information of the second area. The processor 210 may adjust the size of the exposed area by reducing the electronic device 200 in the −Y axis direction using the driving device 250. The processor 210 may adjust the size of the content so as to correspond to the size of the second area while maintaining the aspect ratio of the content in the second area. Referring to reference numeral 647, the entirety of the second area may be a display area 654. The processor 210 may provide the content in the full screen in the display area 654.

In FIG. 6D, the processor 210 may adjust the size of the exposed area of the flexible display 220 after changing the display direction of the content.

Referring to reference numeral 660, the first area of the flexible display 220 may be the portion of the exposed area corresponding to the front surface (the +Z axis direction) of the electronic device 200. The first area may include a display area 670 and a letter box 672. The content may be displayed in the display area 670 of the first area. When the full screen event occurs, the processor 210 may identify the size information of the second area. The processor 210 may change the display direction of the content based on the reference screen information. Referring to reference numeral 662, the first area may include a display area 674 and a letter box 676. The processor 210 may adjust the size of the exposed area by extending the electronic device 200 in the +X axis direction using the driving device 250. The processor 210 may adjust the size of the content so as to correspond to the size of the second area while maintaining the aspect ratio of the content in the second area. Referring to reference numeral 664, the entirety of the second area may be a display area 678. The processor 210 may provide the content in the full screen in the display area 678.

Referring to reference numeral 665, like reference numeral 660, the first area may include a display area 670 and a letter box 672. When the full screen event occurs, the processor 210 may identify the size information of the second area. The processor 210 may change the display direction of the content based on the reference screen information. Referring to reference numeral 667, the first area may include a display area 675 and a letter box 677. The processor 210 may adjust the size of the exposed area by reducing the electronic device 200 in the −X axis direction using the driving device 250. The processor 210 may adjust the size of the content so as to correspond to the size of the second area while maintaining the aspect ratio of the content in the second area. Referring to reference numeral 669, the entirety of the second area may be a display area 679. The processor 210 may provide the content in the full screen in the display area 679.

Figure 7:
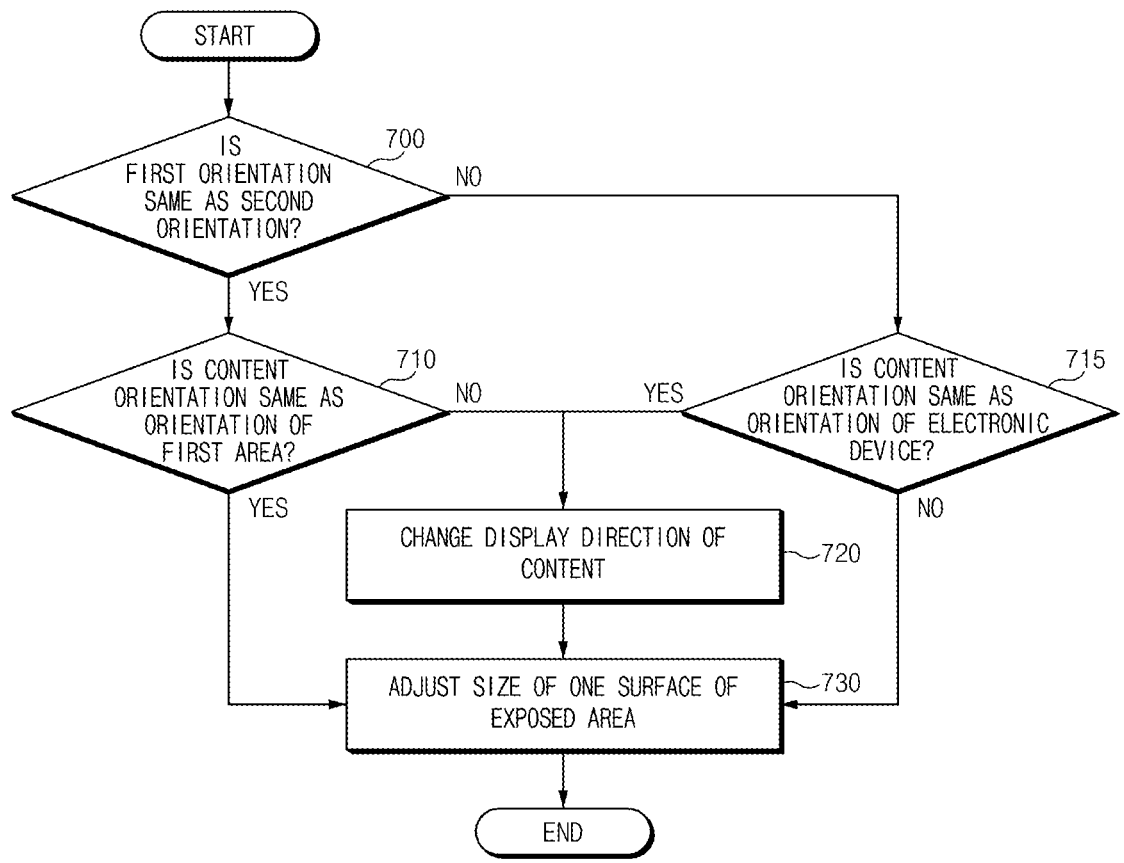
FIG. 7 is a flowchart illustrating an example method for identifying a display direction of content according to various embodiments.

FIG. 7 is a flowchart illustrating an example method for identifying a display direction of content according to various embodiments.

Referring to operation 700, a processor (e.g., the processor 210 in FIG. 2) may determine whether first orientation and second orientation are the same. The first orientation may be an orientation of the electronic device 200 in which the one surface of the exposed area of the flexible display 220 corresponding to the front surface (e.g., the +Z axis direction in FIG. 3B) of the electronic device 200 is minimum. The second orientation may be an orientation of the electronic device 200 in which the one surface of the exposed area of the flexible display 220 corresponding to the front surface (e.g., the +Z axis direction in FIG. 3B) of the electronic device 200 is maximum. Information about the first orientation and the second orientation may be included in the reference screen information of the flexible display 220.

According to an embodiment, the processor 210 may compare the first orientation and the second orientation with each other. Specifically, the first orientation and the second orientation may be compared with each other based on whether the orientation of the electronic device 200 changes when the size of the electronic device 200 is extended or reduced in one direction in a state in which one axis (a horizontal axis or a vertical axis) of the electronic device 200 is fixed. For example, when the size of the electronic device 200 is minimum, the orientation of the electronic device 200 may be the landscape type. When the electronic device 200 is extended or reduced and the orientation of the electronic device 200 is changed to the portrait type in a state in which the one axis (the horizontal axis or the vertical axis) of the electronic device 200 is fixed, the first orientation and the second orientation may be different from each other. When the orientation of the electronic device 200 is maintained as the landscape type even when the electronic device 200 is extended or reduced in the state in which the one axis (the horizontal axis or the vertical axis) of the electronic device 200 is fixed, the first orientation and the second orientation may be the same.

When the first orientation and the second orientation are the same (700-YES), the processor 210 may proceed to operation 710 to determine whether the content orientation is the same as that of a first area (e.g., the first area in FIG. 5). The orientation of the first area may be identified based on the display direction of the content.

According to an embodiment, the orientation of the content may be determined based on the aspect ratio of the content. For example, when the aspect ratio of the content exceeds 1, the orientation of the content may be the landscape type. For example, when the aspect ratio of the content is smaller than 1, the orientation of the content may be the portrait type.

When the orientation of the content and the orientation of the electronic device 200 are not the same (710-NO), the processor 210 may proceed to operation 720 to change the display direction of the content. When the orientation of the content and the orientation of the electronic device 200 are the same (710-YES), the processor 210 may proceed to operation 730. According to an embodiment, the changing of the content display direction may be changing of the display direction of the content in the clockwise direction or the counterclockwise direction by 90 degrees.

When the first orientation and the second orientation are not the same (700-NO), the processor 210 may proceed to operation 715 to determine whether the orientation of the content is the same as that of the electronic device 200. When the orientation of the content and the orientation of the electronic device 200 are the same (715-YES), the processor 210 may proceed to operation 720 to change the display direction of the content. When the orientation of the content and the orientation of the electronic device 200 are not the same (715-NO), the processor 210 may proceed to operation 730.

In operation 730, the processor 210 may adjust the size of the one surface of the exposed area (e.g., the portion of the exposed area corresponding to the front surface of the electronic device 200) based on the size information of the second area. According to an embodiment, the processor 210 may adjust the size of the first area to the size of the second area. Operation 730 may correspond to operation 440 in FIG. 4.

Although operation 720 and operation 730 are shown to be sequentially performed in FIG. 7, this is only an example. According to an embodiment, operation 720 and operation 730 may be performed in a different order.

According to an embodiment, operation 720 and operation 730 may be performed concurrently. According to an embodiment, the processor 210 may adjust the size of the content while adjusting the size of the one surface of the exposed area.

Figure 8A:
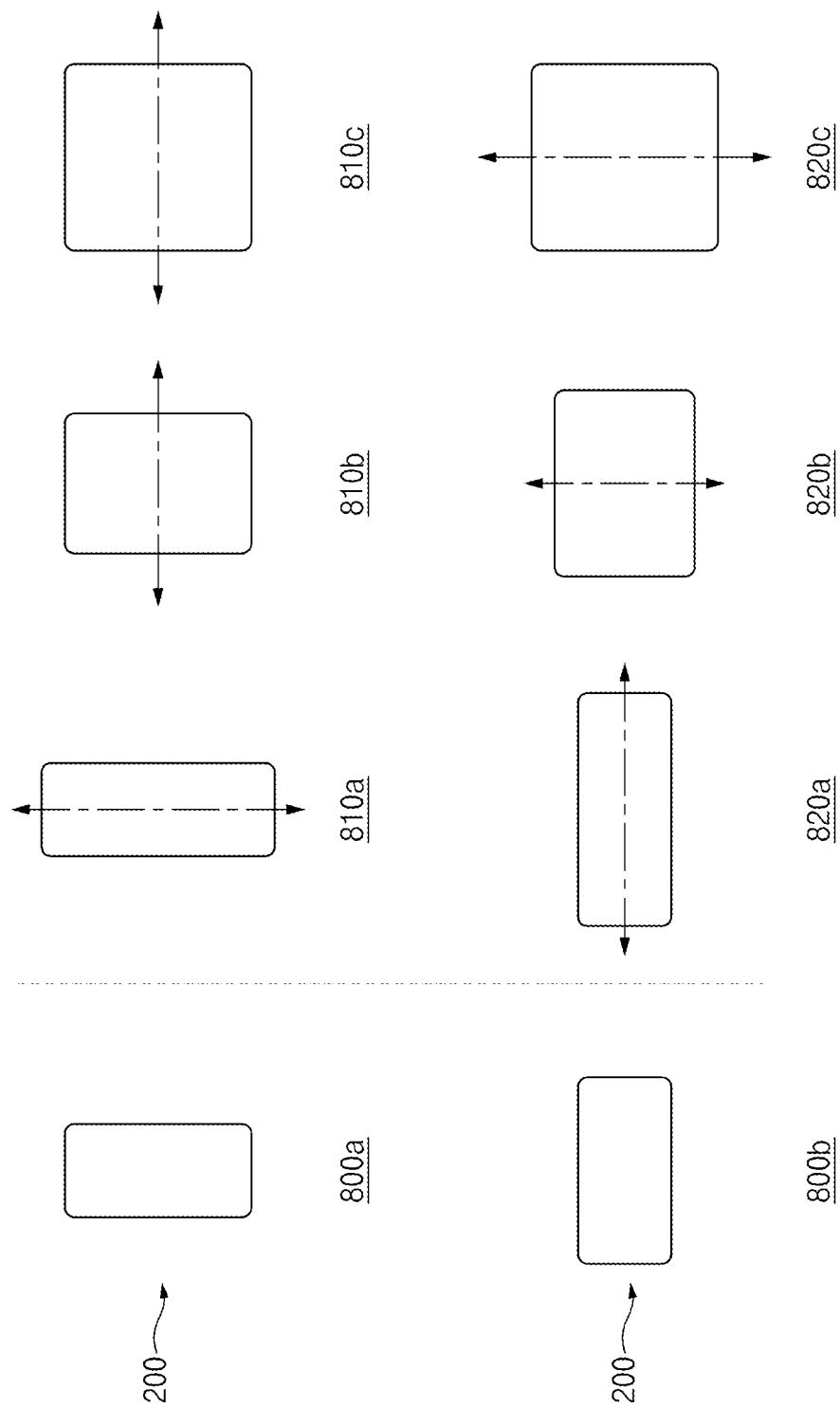
FIG. 8A illustrates exposed areas based on a first orientation and a second orientation according to various embodiments.
Figure 8B:
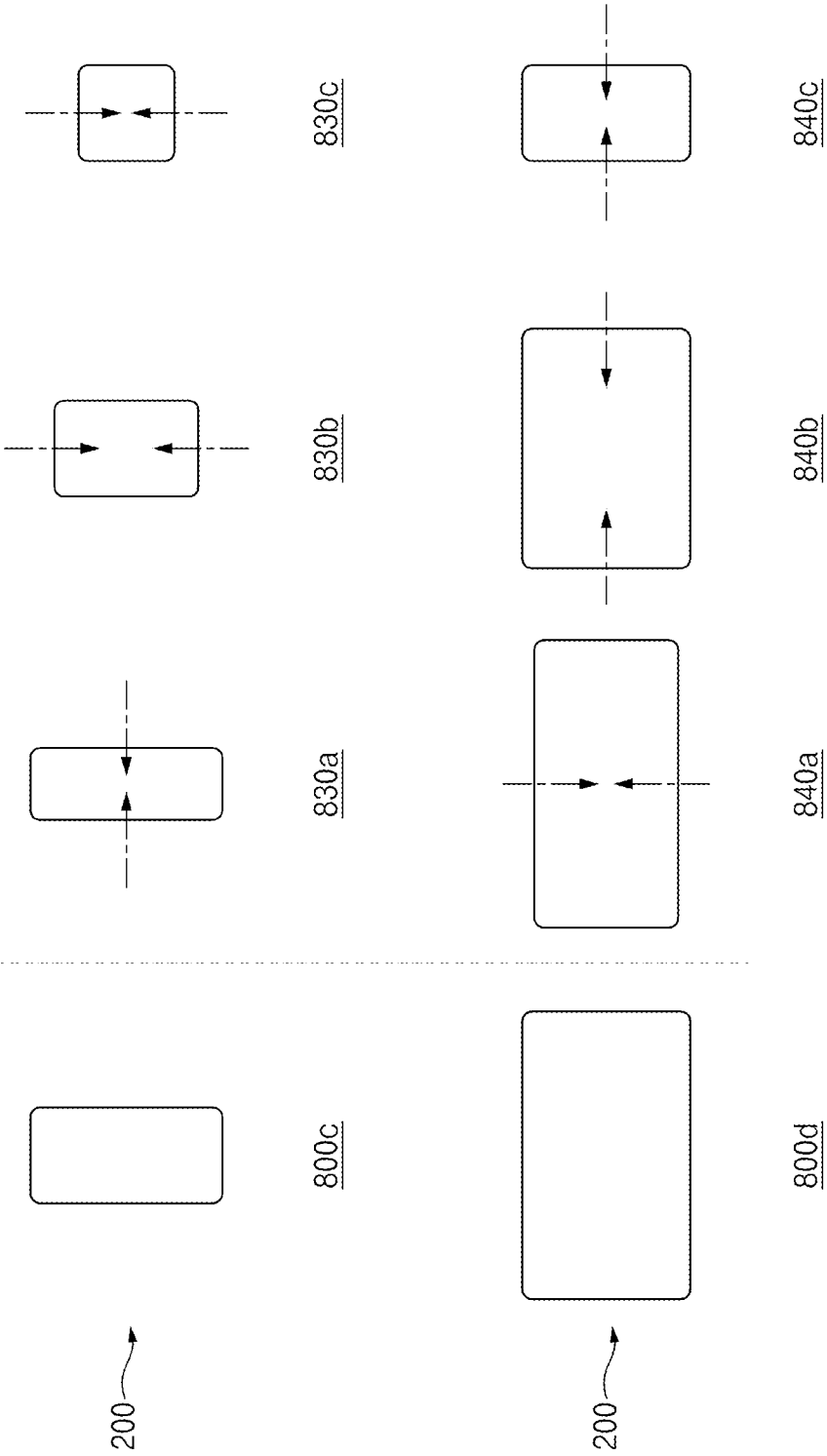
FIG. 8B illustrates exposed areas based on a first orientation and a second orientation according to various embodiments.

FIG. 8A illustrates example exposed areas based on a first orientation and a second orientation according to various embodiments. FIG. 8B illustrates exposed areas based on a first orientation and a second orientation according to various embodiments.

Referring to FIG. 8A, first states 800a and 800b of the electronic device 200 (e.g., the electronic device 200 in FIG. 2) illustrate the case in which the size of the electronic device 200 is minimum.

When the size of the electronic device 200 becomes maximum in the first state 800a by an extension direction and/or an extension degree of the flexible display 220, the electronic device 200 may have one of second states 810a, 810b, and 810c. When the size of the electronic device 200 becomes maximum in the first state 800b by the extension direction and/or the extension degree of the flexible display 220, the electronic device 200 may have one of second states 820a, 820b, and 820c. Orientation of one surface of an exposed area in the first states 800a and 800b (e.g., the portion of the exposed area corresponding to the front surface (e.g., the +Z axis direction in FIGS. 3A and 3B) of the electronic device 200) may be referred to as the first orientation, and orientation of the one surface of the exposed area in the second states 810a, 810b, and 810c and 820a, 820b, and 820c may be referred to as the second orientation.

According to an embodiment, when the electronic device 200 has the first state 800a, the first orientation may be the portrait type. When the electronic device 200 has the second states 810a and 810b, the second orientation may be the portrait type. However, when the electronic device 200 has the second state 810c, the second orientation may be the landscape type. Therefore, it may be understood that, when the electronic device 200 has the second states 810a and 810b, the first orientation and the second orientation are the same, and, when the electronic device 200 has the second state 810c, the first orientation and the second orientation are different from each other.

According to an embodiment, when the electronic device 200 has the first state 800b, the first orientation may be the landscape type. When the electronic device 200 has the second states 820a and 820b, the second orientation may be the landscape type. However, when the electronic device 200 has the second state 820c, the second orientation may be the portrait type. Therefore, it may be understood that, when the electronic device 200 has the second states 820a and 820b, the first orientation and the second orientation are the same, and, when the electronic device 200 has the second state 820c, the first orientation and the second orientation are different from each other.

Referring to FIG. 8B, third states 800c and 800d of the electronic device 200 illustrate the case in which the size of the electronic device 200 is maximum.

When the size of the electronic device 200 becomes minimum in the third state 800c by a reduction direction and/or a reduction degree of the flexible display 220, the electronic device 200 may have one of fourth states 830a, 830b, and 830c. When the size of the electronic device 200 becomes minimum in the third state 800d by the reduction direction and/or the reduction degree of the flexible display 220, the electronic device 200 may have one of fourth states 840a, 840b, and 840c. Orientation of the one surface of the exposed area in the third states 800c and 800d may, for example, be referred to as the second orientation, and orientation of the one surface of the exposed area in the fourth states 830a, 830b, and 830c and 840a, 840b, and 840c may, for example, be referred to as the first orientation.

According to an embodiment, when the electronic device 200 has the third state 800c, the second orientation may be the portrait type. When the electronic device 200 has the fourth states 830a and 830b, the first orientation may be the portrait type. However, when the electronic device 200 has the fourth state 830c, the first orientation may be the landscape type. Therefore, it may be understood that, when the electronic device 200 has the fourth states 830a and 830b, the first orientation and the second orientation are the same, and, when the electronic device 200 has the fourth state 830c, the first orientation and the second orientation are different from each other.

According to an embodiment, when the electronic device 200 has the third state 800*d*, the second orientation may be the landscape type. When the electronic device 200 has the fourth states 840*a* and 840*b*, the first orientation may be the landscape type. However, when the electronic device 200 has the fourth state 840*c*, the first orientation may be the portrait type. Therefore, it may be understood that, when the electronic device 200 has the fourth states 840*a* and 840*b*, the first orientation and the second orientation are the same, and, when the electronic device 200 has the fourth state 840*c*, the first orientation and the second orientation are different from each other.

Figure 9:
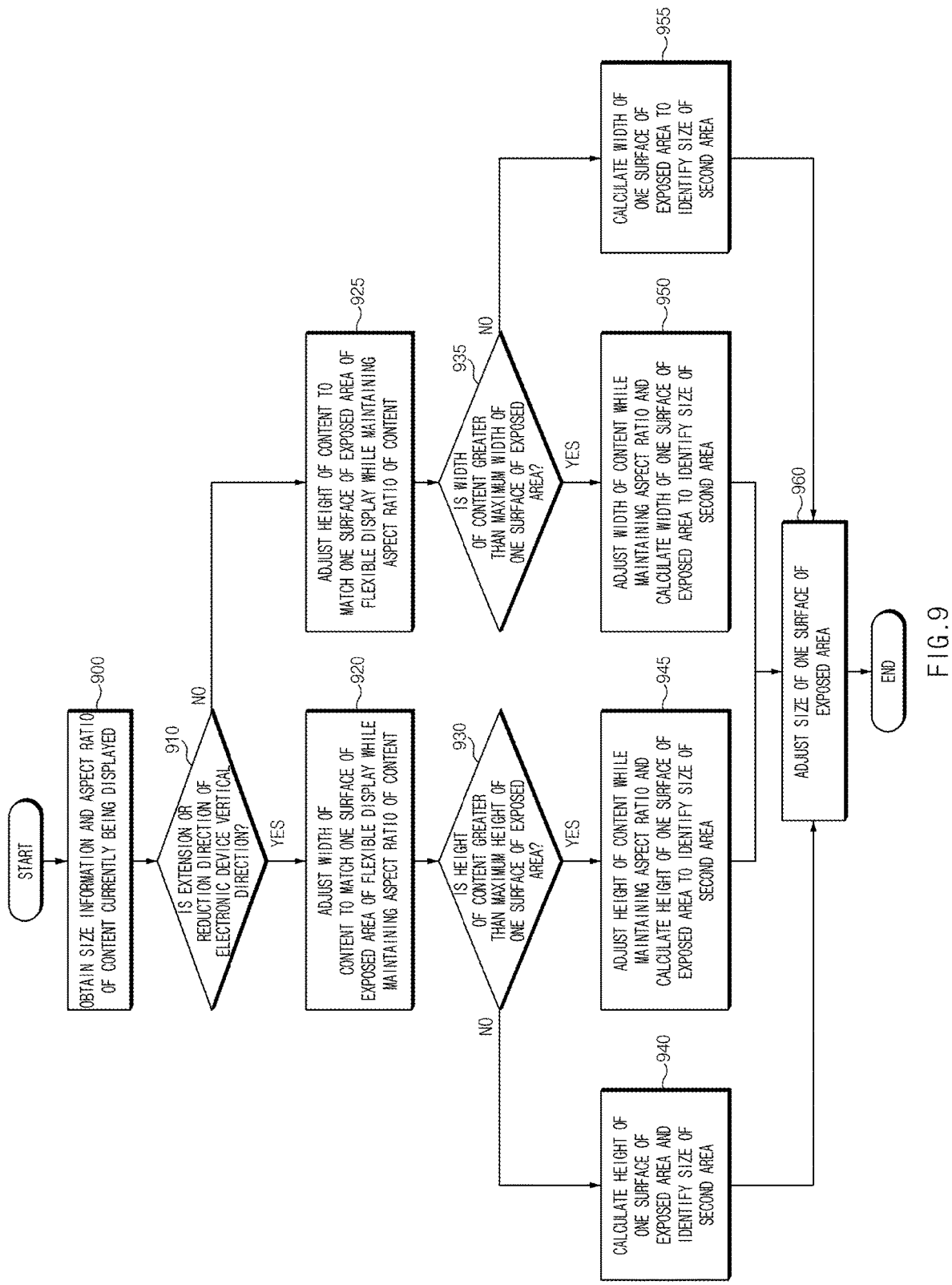
FIG. 9 is a flowchart illustrating an example identification of a second area and size adjustment of content according to various embodiments.

FIG. 9 is a flowchart illustrating example identification of a second area and size adjustment of content according to various embodiments. Operations in FIG. 9 may be performed after determining whether to change the display direction of the content in FIG. 7.

Referring to operation 900, a processor (e.g., the processor 210 in FIG. 2) may obtain size information and the aspect ratio of the content currently being displayed via the display area of the one surface of the exposed area (e.g., the portion of the exposed area corresponding to the front surface of the electronic device 200). The aspect ratio of the content may be the value obtained by dividing the height of the content by the width of the content.

In operation 910, the processor 210 may determine whether the extension or reduction direction of the electronic device 200 is a vertical direction. The extension or reduction direction of the electronic device 200 may be understood as one of the vertical direction and a horizontal direction.

When the extension or reduction direction of the electronic device 200 is the vertical direction (910-YES), the processor 210 may proceed to operation 920. In operation 920, the processor 210 may adjust the width of the content to match the one surface of the exposed area of the flexible display 220 while maintaining the aspect ratio of the content. For example, when the width of the content is smaller than a width of the one surface of the exposed area, the width of the content may be increased to match the width of the one surface of the exposed area. In this case, the height of the content may also be increased based on the aspect ratio. For another example, when the width of the content is greater than the width of the one surface of the exposed area, the width of the content may be reduced to match the width of the exposed area. In this case, the height of the content may also be reduced based on the aspect ratio.

In operation 930, the processor 210 may determine whether the adjusted height of the content is greater than a maximum height of the one surface of the exposed area. The maximum height of the one surface of the exposed area may, for example, be referred to as a height when the electronic device 200 is extended to the maximum. Maximum height information of the one surface of the exposed area may be included in the reference screen information of the flexible display 220.

When the adjusted height of the content is smaller than the maximum height of the one surface of the exposed area (930-NO), the processor 210 may proceed to operation 940. In operation 940, the processor 210 may calculate the height of the one surface of the exposed area and identify the size of the second area. The processor 210 may proceed to operation 960.

When the adjusted height of the content is greater than the maximum height of the one surface of the exposed area (930-YES), the processor 210 may proceed to operation 945. In operation 945, the processor 210 may adjust the height of the content while maintaining the aspect ratio and calculate the height of the one surface of the exposed area to identify the size of the second area. According to an embodiment, the processor 210 may adjust the height of the content to match the maximum height of the one surface of the exposed area. The processor 210 may calculate the height of the one surface of the exposed area as the maximum height of the one surface of the exposed area to identify the size of the second area. In this case, the width of the content may be reduced based on the aspect ratio. The processor 210 may proceed to operation 960.

When the extension or reduction direction of the electronic device 200 is the horizontal direction (910-NO), the processor 210 may proceed to operation 925. In operation 925, the processor 210 may adjust the height of the content to match the one surface of the exposed area of the flexible display 220 while maintaining the aspect ratio of the content. For example, when the height of the content is smaller than the height of the one surface of the exposed area, the height of the content may be increased to match the height of the one surface of the exposed area. In this case, the width of the content may also be increased based on the aspect ratio. For an example, when the height of the content is greater than the height of the one surface of the exposed area, the height of the content may be reduced to match the height of the one surface of the exposed area. In this case, the width of the content may also be reduced based on the aspect ratio.

In operation 935, the processor 210 may determine whether the adjusted width of the content is greater than a maximum width of the one surface of the exposed area. The maximum width of the one surface of the exposed area may, for example, be referred to as a height when the electronic device 200 is extended to the maximum. Maximum width information of the one surface of the exposed area may be included in the reference screen information of the flexible display 220.

When the adjusted width of the content is greater than the maximum width of the one surface of the exposed area (935-YES), the processor 210 may proceed to operation 950. In operation 950, the processor 210 may adjust the width of the content while maintaining the aspect ratio and calculate the width of the one surface of the exposed area to identify the size of the second area. According to an embodiment, the processor 210 may adjust the width of the content to match the maximum width of the one surface of the exposed area. The processor 210 may calculate the width of the one surface of the exposed area as the maximum width of the one surface of the exposed area to identify the size of the second area. In this case, the height of the content may be reduced based on the aspect ratio. The processor 210 may proceed to operation 960.

When the adjusted width of the content is smaller than the maximum width of the one surface of the exposed area (935-NO), the processor 210 may proceed to operation 955. In operation 955, the processor 210 may calculate the width of the one surface of the exposed area to identify the size of the second area. The processor 210 may proceed to operation 960.

In operation 960, the processor 210 may adjust the size of the one surface of the exposed area based on the identified size of the second area. In FIG. 9, operation 960 is illustrated as being performed after adjusting the height or the width of the content, but the adjusting of the height or the width of the content may be performed simultaneously with operation 960.

Figure 10:
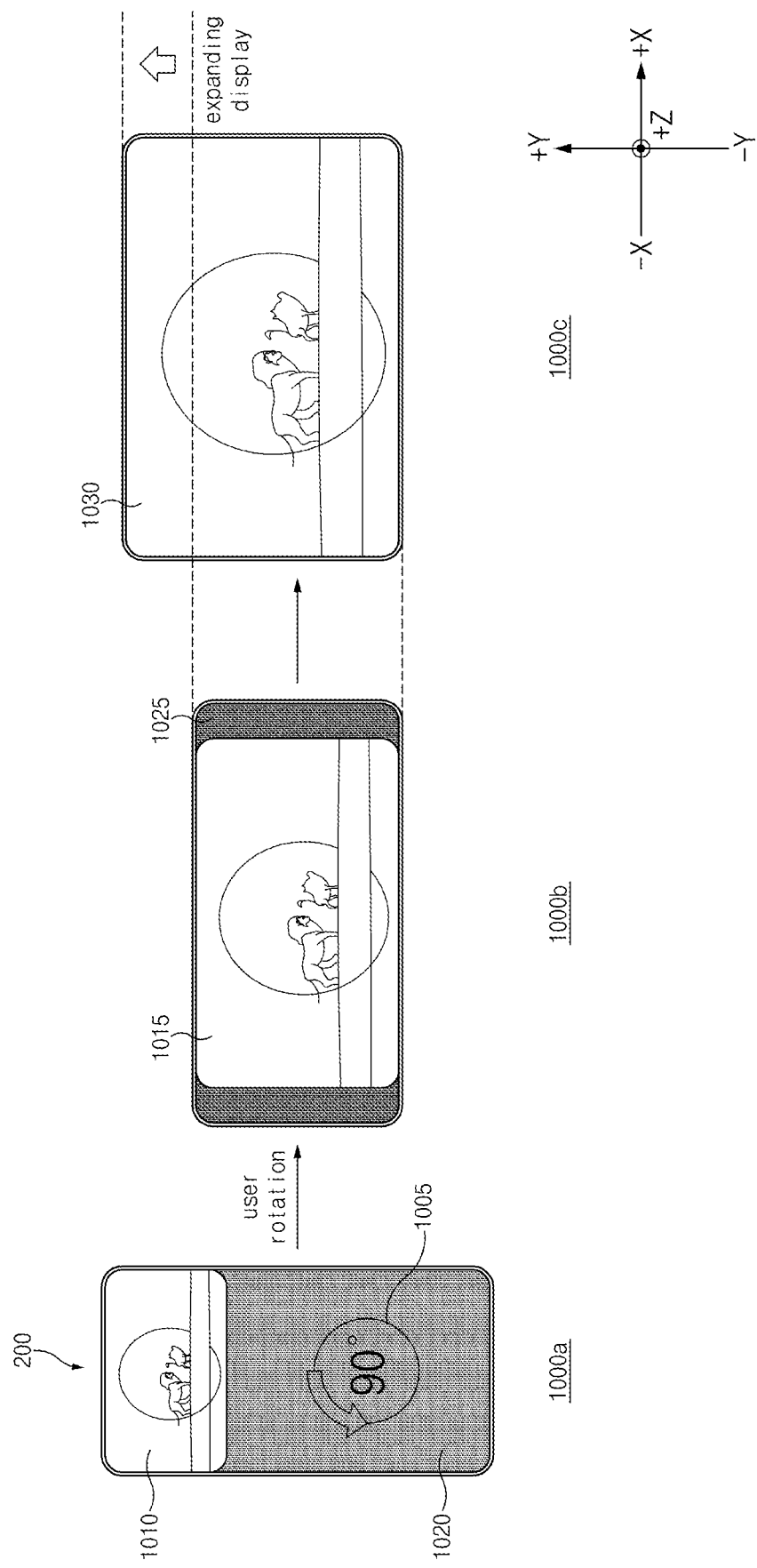
FIG. 10 illustrates an example UI for requesting rotation of an electronic device according to various embodiments.

FIG. 10 illustrates an example UI for requesting rotation of an electronic device according to various embodiments.

According to an embodiment, a processor (e.g., the processor 210 in FIG. 2) may change a display direction of content 1010 to provide the content 1010 in the full screen mode. A description of the changing of the display direction of the content 1010 may refer to the description of FIG. 7. The processor 210 may provide the UI (user interface) for requesting the rotation of the electronic device 200 to allow the changed display direction of the content 1010 to match the orientation of the one surface of the exposed area (e.g., the portion of the exposed area corresponding to the front surface of the electronic device 200). For example, a UI 1005 in FIG. 10 may be referred to as the UI for requesting the rotation of the electronic device 200 of operation 540 in FIG. 5.

In reference numeral 1000*a*, the processor 210 may display the content in a display area 1010. An area other than the display area 1010 in the one surface of the exposed area (e.g., the first area) may be referred to as a letter box 1020. The processor 210 may display the UI 1005 for requesting the rotation of the electronic device 200 on the one surface of the exposed area. According to an embodiment, the UI 1005 may be displayed in the letter box 1020 in which the content is not displayed. The UI 1005 in reference numeral 1000*a* may be for requesting the user to rotate the electronic device 200 by 90 degrees in the counterclockwise direction.

According to an embodiment, the processor 210 may sense the rotation of the electronic device 200 using at least one sensor (e.g., the at least one sensor 240 in FIG. 2). The rotation of the electronic device 200 may change the orientation of the electronic device 200 as shown by reference numeral 1000*b*. The processor 210 may display the content whose display direction is changed in a display area 1015. Even after the display direction of the content is changed, a letter box 1025 may occur on the one surface of the exposed area. In the reference numeral 1000*b*, the orientation of the one surface of the exposed area and the orientation of the content may match each other.

Referring to reference numeral 1000*c*, the processor 210 may adjust the size of the one surface of the exposed area to provide the full screen. For example, the processor 210 may extend the electronic device 200 in the +Y axis direction using a driving device (e.g., the driving device 250 in FIG. 2). The processor 210 may use an entirety of the one surface (e.g., the second area) of the exposed area as a display area 1030 as shown by the reference numeral 1000*c*. The processor 210 may provide the content in the full screen in the display area 1030. In the reference numeral 1000*c*, the letter box 1025 may be removed.

Figure 11:
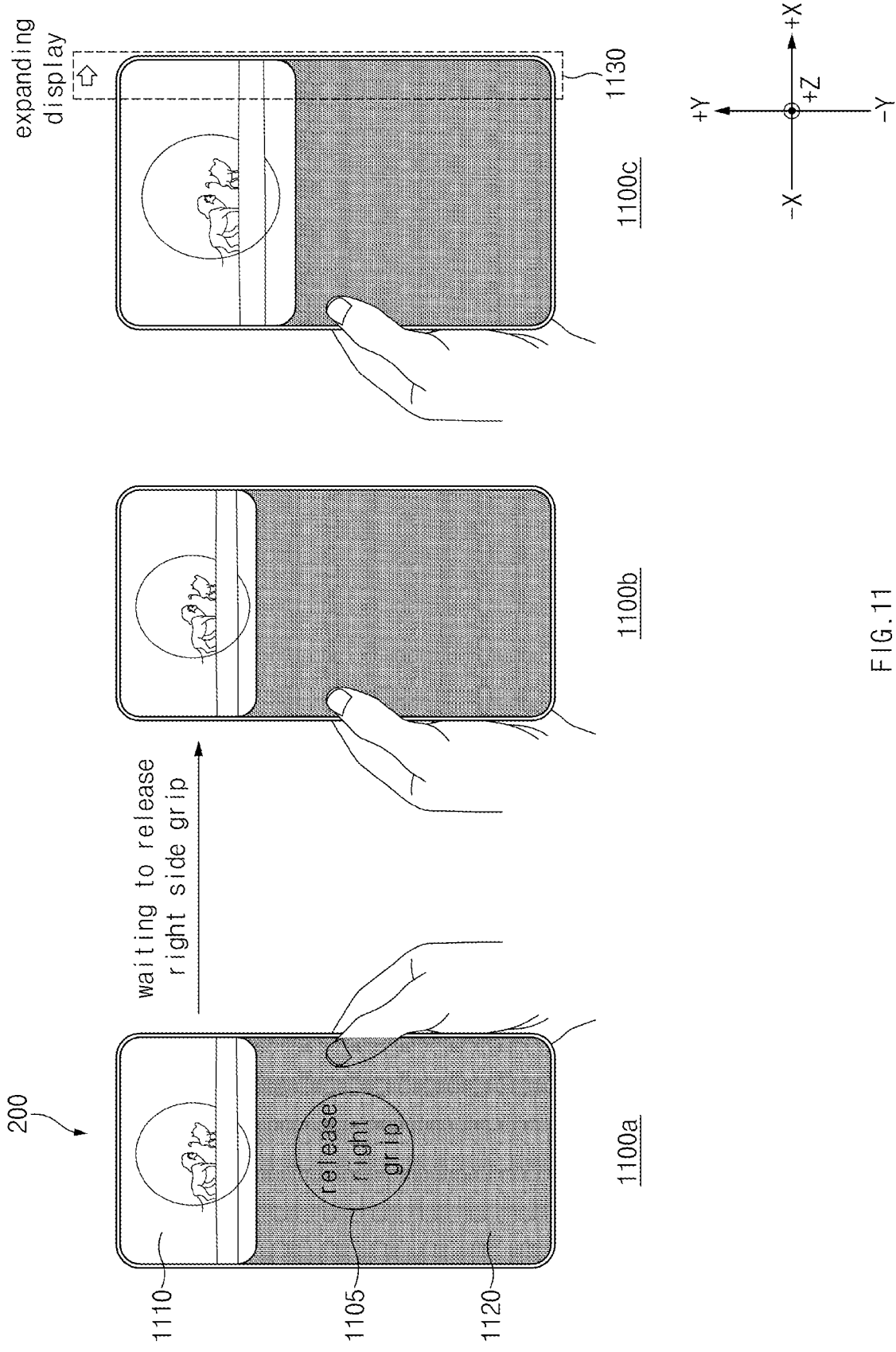
FIG. 11 illustrates an example UI for requesting release of a contact with a variable area according to various embodiments.

FIG. 11 illustrates an example UI for requesting release of a contact with a variable area according to various embodiments.

According to an embodiment, the processor 210 may display the content via a display area 1110 of the one surface (e.g., the first area) of the exposed area. An area other than the display area 1110 of the one surface of the exposed area may be referred to as the letter box.

In reference numeral 1100*a*, the processor 210 may display an UI 1105 for requesting the release of the contact of the external object with the variable area. The UI 1105 may be displayed in a letter box 1120 in which the content is not displayed. The electronic device 200 in the reference numeral 1100*a* may be referred to as the slidable electronic device that may be extended in the +X axis direction. The variable area may be understood as one area of the flexible display 220 that is extended or reduced by a driving device (e.g., the driving device 250 in FIG. 2). For example, the variable area may be a display area 1130 in reference numeral 1100*c*. The variable area 1130 may include one area in the +X axis direction of the flexible display 220. It may be understood that the UI 1105 in the reference numeral 1100*a* is for requesting release of grip of a user's right hand. In addition, the UI 1105 in the reference numeral 1100*a* is not limited to the illustrated embodiment. For example, the UI 1105 may be displayed with a color, a shape, or a gradation that is visually distinct from the content 1110 in an area in the letter box 1120 adjacent to the display area 1130 in the reference numeral 1100*c*.

The processor 210 may sense the release of the contact with the variable area using at least one sensor (e.g., the at least one sensor 240 in FIG. 2). As shown by the reference numeral 1100*b*, when the processor 210 senses that the contact of the external object with the variable area is released, the processor 210 may remove the UI 1105 and adjust the size of the one surface of the exposed area. The processor 210 may extend the flexible display 220 in the +X axis direction as shown by the reference numeral 1100*c*.

In an embodiment, the processor 210 may provide a notification for requesting the release of the contact of the external object (e.g., the user's body) with the variable area. For example, the processor 210 may provide the notification by sound using an audio module (e.g., the audio module 170 in FIG. 1) of the electronic device 200 and/or vibration using a haptic module (e.g., the haptic module 179 in FIG. 1). In an embodiment, the processor 210 may provide the UI 1105 and the notification (e.g., the sound and/or the vibration) together.

User's inconvenience caused by an unexpected shape change of the electronic device 200 may be prevented or reduced via the provision of the UI 1105 of the processor 210, and an obstacle in the extension direction of the flexible display 220 may be removed to prevent or reduce damage to the driving device 250.

Figure 12B:
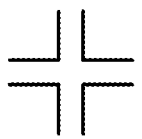
FIG. 12B illustrates an example UI for providing a full screen according to various embodiments.
Figure 12B:
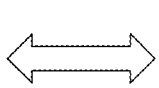
Figure 12B:
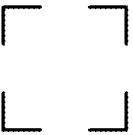
Figure 12B:
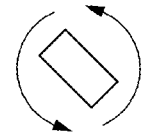
Figure 12B:
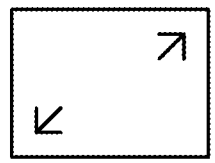
Figure 12B:
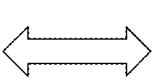
Figure 12B:
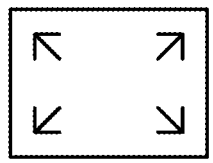
Figure 12B:
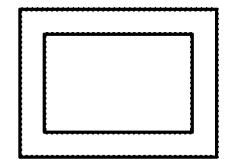
Figure 12B:
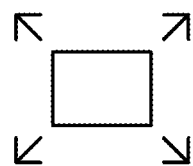
Figure 12B:
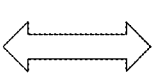
Figure 12B:
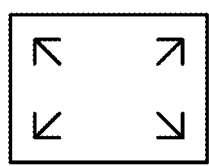
Figure 12B:
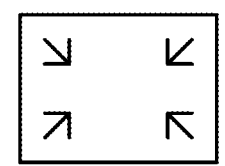

FIG. 12A illustrates an example UI for providing a full screen according to various embodiments. FIG. 12B illustrates an example UI for providing a full screen according to various embodiments.

Referring to FIG. 12A, a processor (e.g., the processor 210 in FIG. 2) may display the content in a display area 1250 of the one surface (e.g., the first area) of the exposed area of the flexible display 220. An area other than the display area 1250 in the one surface of the exposed area may be referred to as a letter box 1255. According to an embodiment, the processor 210 may display a UI 1210 for providing the full screen mode on the display area 1250 (e.g., content) together as shown by reference numeral 1200*a*. The processor 210 may receive a user input for the UI 1210 and provide the content in the full screen as shown by reference numeral 1200*b*.

According to an embodiment, the processor 210 may use an entirety of one surface (e.g., the second area) of the exposed area in the reference numeral 1200*b* as the display area 1265. The processor 210 may display the content in the display area 1265. The processor 210 may also display a UI 1215 for terminating the full screen mode in the display area 1265. The processor 210 may receive a user input for the UI 1215 and restore the display of the content back to that in the reference numeral 1200*a*.

The full screen mode in FIG. 12A is only an example, and the provision of the full screen mode in the disclosure is not limited thereto. For example, the full screen mode in FIG. 12A may, for example, be referred to as changing the display direction of the content. However, unlike FIG. 12A, the full screen mode may be subdivided and provided based on the ratio of the content and/or whether the flexible display 220 is extended or reduced. A description of the same may refer to a description of FIG. 12B.

Referring to FIG. 12B, the processor 210 may display a UI related to the provision and/or the termination of the full screen mode on content (e.g., the content 1250).

According to an embodiment, the UI 1210 may be the UI for providing the full screen mode. The UI 1215 may be the UI for terminating the full screen mode. The processor 210 may provide or terminate the full screen mode by receiving a user input for the UIs 1210 and 1215 and changing the display direction of the content.

According to an embodiment, a UI 1217 may be a UI for changing the display direction of the content being displayed via the flexible display 220. In this case, the processor 210 may display the content by changing the display direction of the content by 90 degrees in the clockwise direction (or the counterclockwise direction). At least one of the width and the length of the rotated content may be adjusted to match the width or the length of the one surface of the exposed area (e.g., the portion of the exposed area corresponding to the front surface of the electronic device 200) respectively corresponding thereto.

According to an embodiment, the full screen mode may be provided in various ways based on the aspect ratio of the content based on the user's setting. UIs 1220, 1222, and 1224 may be understood as UIs for providing the full screen mode based on the aspect ratio of the content. For example, the UI 1220 may be a UI for providing the full screen while maintaining the aspect ratio of the content. When the processor 210 receives a user input for the UI 1222, the processor 210 may match the height or the width of the content to the height or the width of the one surface of the exposed area of the flexible display 220 while maintaining the aspect ratio of the content. In this case, the size of the content may be smaller than the size of the one surface of the exposed area. Accordingly, the letter box may be displayed along with the content on the one surface of the exposed area. For example, the UI 1222 may be a UI for providing the full screen regardless of the aspect ratio of the content. When the processor 210 receives a user input for the UI 1222, the processor 210 may match the height and the width of the content to the height and the width of the flexible display 220. In this case, the aspect ratio of the content may be different from that before the full screen mode. The content may be displayed on the entirety of the one surface of the exposed area. For example, the UI 1224 may be a UI for providing the full screen while maintaining the aspect ratio of the content. When the processor 210 receives a user input for the UI 1224, the processor 210 may match the height or the width of the content to the height or the width of the one surface of the exposed area of the flexible display 220 while maintaining the aspect ratio of the content. In this case, the size of the content may be greater than the size of the one surface of the exposed area. The processor 210 may match a center of the one surface of the exposed area to a center of the content, and may not display a partial area of the content that is out of the one surface of the exposed area.

According to an embodiment, when the full screen is provided by adjusting the size of the flexible display 220 as shown in FIG. 4, the processor 210 may provide UIs 1230 and 1235 related to the extension or the reduction of the flexible display 220. For example, the processor 210 may change the UI 1222 for the full screen mode to the UI 1230 or 1235 based on user selection.

The UI 1230 may be a UI for extending the electronic device 200 to provide the content in the full screen. The UI 1235 may be a UI for reducing the electronic device 200 to provide the content in the full screen. According to an embodiment, the processor 210 may determine whether to extend or reduce the one surface of the exposed area and display the UI 1230 or UI 1235 on the content based on the determination. A description of a method for determining whether to extend or reduce the one surface of the exposed area may refer to the description of FIG. 9. When the processor 210 provides the full mode corresponding to each UI 1230 or 1235, the aspect ratio of the content may be maintained.

Figure 13:
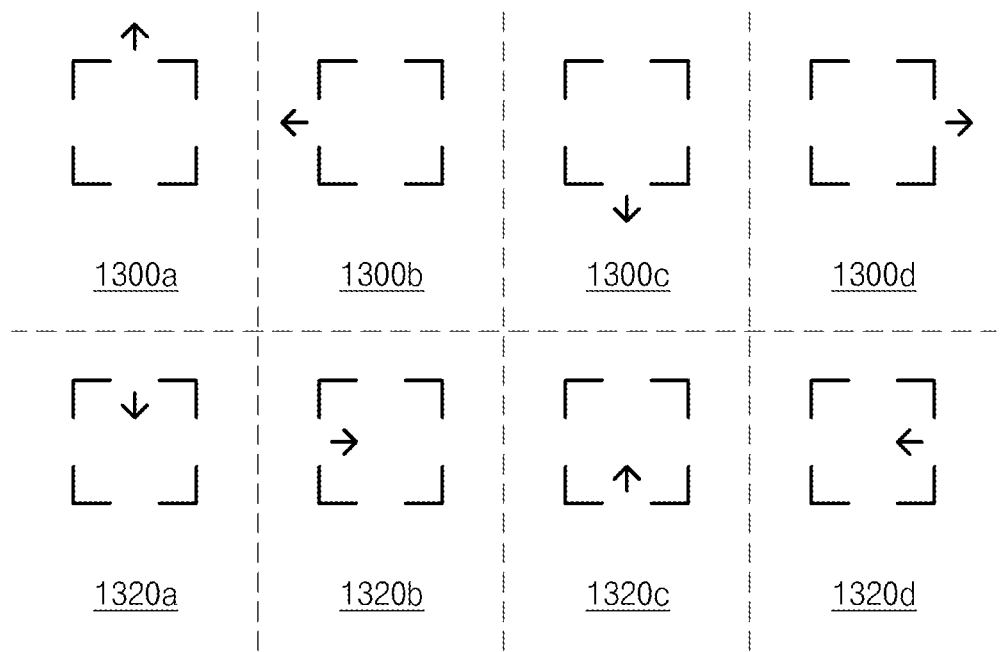
FIG. 13 illustrates various example UIs based on display size adjustment according to various embodiments.
Figure 13:
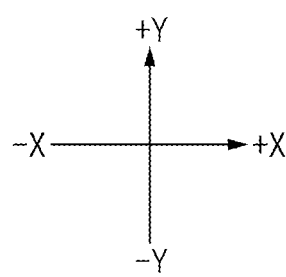

FIG. 13 illustrates various example UIs based on display size adjustment according to various embodiments.

When providing the full screen mode in response to a user input for the UIs 1230 and 1235 in FIG. 12B, a processor (e.g., the processor 210 in FIG. 2) may provide the UI related to the extension or the reduction of the flexible display 220.

For example, a UI 1300*a* may, for example, indicate that a flexible display (e.g., the flexible display 220 in FIG. 2) is extended in the +Y axis direction when the content is provided in the full screen. A UI 1300*b*, a UI 1300*c*, and a UI 1300*d* may, for example, respectively indicate that the flexible display 220 is extended in the −X axis, the −Y axis, and the +X axis directions, respectively, when the content is provided in the full screen.

For an example, a UI 1320*a* may, for example, indicate that the flexible display 220 is reduced in the −Y axis direction when the content is provided in the full screen. A UI 1320*b*, a UI 1320*c*, and a UI 1320*d* may, for example, respectively indicate that the flexible display 220 is reduced in the +X axis, the +Y axis, and the −X axis directions, respectively, when the content is provided in the full screen.

Figure 14:
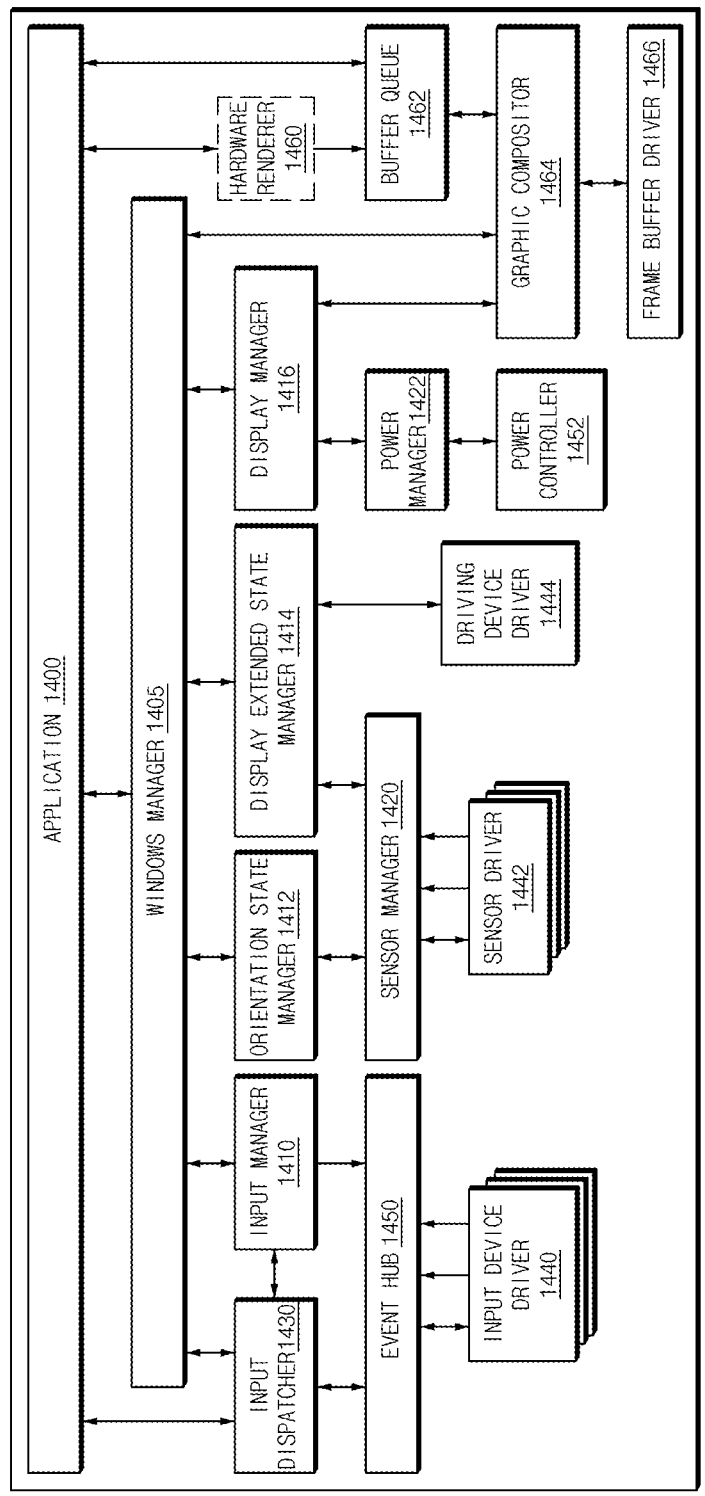
FIG. 14 illustrates an example program according to various embodiments.

FIG. 14 illustrates an example program according to various embodiments.

According to an embodiment, a program (e.g., the program 140 in FIG. 1) may include an operating system (not shown) (e.g., the operating system 142 in FIG. 1) for controlling one or more resources of the electronic device 200 (e.g., the electronic device 200 in FIG. 2), middleware (not shown) (e.g., the middleware 144 in FIG. 1), or an application 1400 (e.g., the application 146 in FIG. 1) executable on the operating system 142. At least some of the programs 140 may be, for example, preloaded in the electronic device 200 at a time of manufacture, or may be downloaded or updated from an external electronic device (e.g., the electronic device 102 or 104 or the server 108 in FIG. 1) when used by the user.

The operating system 142 may control management (e.g., allocation or retrieval) of one or more system resources (e.g., a process, a memory, or power) of the electronic device 200. The operating system 142 may include, additionally or alternatively, one or more driver programs for driving a component of the electronic device 200, for example, the flexible display 220 (e.g., the flexible display 220 in FIG. 2), the memory 230 (e.g., the memory 230 in FIG. 2), the at least one sensor 240 (e.g., the at least one sensor 240 in FIG. 2), and/or the driving device 250 (e.g., the driving device 250 in FIG. 2).

According to an embodiment, an input device driver 1440 may control a component of the electronic device 200 for receiving the user input (e.g., a touch input, a key input, and a mouse input). An event hub 1450 may receive signals obtained via an input device (e.g., the input device driver 1440) and the at least one sensor 240, and convert the obtained signals into events suitable for the operating system 142. According to an embodiment, a sensor driver 1442 may measure the extended state (e.g., the extension or the reduction) of the flexible display 220 and the orientation of the one surface of the exposed area (e.g., the portion of the exposed area corresponding to the front surface of the electronic device 200) using the at least one sensor 240 (a time of flight (ToF) sensor, an illumination sensor, a bending sensor, the hall sensor, or a motion sensor) of the flexible display 220. According to an embodiment, a driving device driver 1444 may provide power for extending or reducing the flexible display 220 based on the signal generated by the processor 210. The middleware 144 may provide various functions to the application 1400 such that functions or information provided from the one or more resources of the electronic device 200 may be used by the application 1400. The middleware 144 may include, for example, a windows manager 1405, an input manager 1410, an orientation state manager 1412, a display extended state manager 1414, a display manager 1416, a sensor manager 1420, and/or a power manager 1422.

According to an embodiment, the middleware 144 may dynamically omit some existing components or add new components. According to an embodiment, at least a portion of the middleware 144 may be included as a portion of the operating system 142 or implemented as separate software different from the operating system 142.

According to an embodiment, the windows manager 1405 may manage one or more graphic user interface (GUI) resources used in the flexible display 220. According to an embodiment, the input manager 1410 may provide information of the input device (e.g., the touch panel and a key button) included in the electronic device 200. For example, the input manager 1410 may set display viewport information for interpreting raw data of the input device (e.g., the input device driver 1440). An input dispatcher 1430 may transfer the input received via the input device to the windows manager 1405 or a processor (e.g., the processor 210 in FIG. 2). According to an embodiment, the orientation state manager 1412 may provide orientation information of the one surface of the exposed area of the flexible display 220 based on the information obtained using the at least one sensor 240. The orientation information of the one surface of the exposed area may be identified based on the display direction of the content. According to an embodiment, the display extended state manager 1414 may determine the current extended state (e.g., the extension or the reduction) of the display based on the signal obtained via the at least one sensor 240 and provide the determination result to other middleware or driver. According to an embodiment, the display manager 1416 may manage a lifecycle (e.g., connection, property control, or removal) of the flexible display 220 and may manage display mapping to output the GUI. According to an embodiment, the display area for displaying the content (e.g., the GUI) may be changed by the change of the display such as the extension or the reduction of the flexible display 220. According to an embodiment, the sensor manager 1420 may convert the signal obtained via the at least one sensor 240 into a sensor event suitable for the operating system 142. According to an embodiment, the power manager 1422 may manage, for example, a capacity, a temperature, or power of a battery (e.g., the battery 189 in FIG. 1), and may determine or provide related information necessary for the operation of the electronic device 200 using corresponding information among those. According to an embodiment, the power manager 1422 may be associated with a basic input/output system (BIOS) (not shown) of the electronic device 200. The power manager 1422 may control power supply to a system circuit (e.g., a central processing unit (CPU) and a BUS) and the display module of the electronic device 200 via a power controller 1452.

According to an embodiment, a hardware renderer 1460 may be an acceleration module for drawing the GUI generated by the application 1400 to a buffer. The hardware renderer 1460 is an example component and may be omitted. Operation of the hardware renderer 1460 may be processed by the processor 210. According to an embodiment, a buffer queue 1462 may control a memory buffer to transfer GUI information (graphic bitmap information) received from the application 1400 to a graphic compositor 1464. According to an embodiment, the graphic compositor 1464 may generate and output one bitmap information to display, in the exposed area of the flexible display 220, the graphic bitmap information received from various sources (e.g., the windows manager 1405, the display manager 1416, and the buffer queue 1462) in a combined manner. According to an embodiment, a frame buffer driver 1466 may control a frame buffer storing graphic information to be displayed on the flexible display 220.

The application 1400 may include, for example, applications of a home, a dialer, a SMS/MMS, an instant message (IM), a browser, a camera, an alarm, a contact, a voice recognition, an email, a calendar, a media player, an album, a watch, a health (e.g., for measuring biometric information such as an exercise amount or a blood sugar), or an environmental information (e.g., for measuring atmospheric pressure, humidity, or temperature information). According to an embodiment, the application 1400 may further include an information exchange application capable of supporting an information exchange between the electronic device 200 and an external electronic device (e.g., the electronic device 102 or 104 or the server 108 in FIG. 1). The information exchange application may include, for example, an application set to obtain specified information (e.g., media (an image and a video), a call, a message, or an alarm) from the external electronic device or an application set to manage the external electronic device. For example, the electronic device 200 may obtain the specified information (e.g., the media) transferred from another application (e.g., a media player) of the external electronic device. Additionally or alternatively, the information exchange application may receive notification information from the external electronic device and provide the same to the user of the electronic device 200.

According to an example embodiment, the electronic device 200 may include a first housing (e.g., the first housing 260 in FIG. 2), a second housing (e.g., the second housing 265 in FIG. 2) fastened with the first housing 260 and configured to perform a sliding operation, a driving device (e.g., the driving device 250 in FIG. 2) configured to adjust the sliding operation, a flexible display (e.g., the flexible display 220 in FIG. 2) whose area visually exposed on a front surface of the electronic device 200 changes in a size in response to the sliding operation of the second housing 265, at least one sensor (e.g., the at least one sensor 260), a memory (e.g., the memory 230 in FIG. 2) storing instructions, and a processor (e.g, processor 210 in FIG. 2) electrically connected to the flexible display 220, the driving device 250, the at least one sensor 240, and the memory 230. The instructions, when executed by the processor 210, cause the electronic device 200 to display content via at least a portion of a first area of the flexible display 220, identify an aspect ratio of the content, obtain orientation information of the electronic device 200 using the at least one sensor 240, and identify size information of a second area of the flexible display 220 capable of maximally displaying the content with the identified aspect ratio of the content based on the obtained orientation information, the first area and the second area being one surface of the exposed area of the flexible display 220, and the second area being an area extended or reduced from the first area.

According to an example embodiment, the instructions, when executed by the processor 210, may cause the electronic device 200 to adjust the one surface of the exposed area from the first area to the second area using the driving device.

According to an example embodiment, the memory 250 may store reference screen information of the flexible display 220. The instructions, when executed by the processor 210, may cause the electronic device 200 to identify whether to change a display direction of the content based on the reference screen information.

According to an example embodiment, the reference screen information may include minimum size information and maximum size information of the one surface of the exposed area changing based on the sliding of the second housing 265, and the instructions, when executed by the processor 210, may cause the electronic device 200 to identify orientation when a size of the one surface of the exposed area is minimum as a first orientation, identify orientation when the size of the one surface of the exposed area is maximum as a second orientation, and compare the first orientation and the second orientation with each other to determine whether to change the display direction.

According to an example embodiment, the first orientation and the second orientation may be one of a vertical orientation or a horizontal orientation.

According to an example embodiment, the instructions, when executed by the processor 210, may cause the electronic device 200 to provide a user interface (UI) for requesting rotation of the electronic device 200 when the display direction is changed.

According to an example embodiment, the instructions, when executed by the processor 210, may cause the electronic device 200 to provide a UI for requesting release of a contact when an external object identified via the at least one sensor 240 is in contact with a variable area of the flexible display 220.

According to an example embodiment, the instructions, when executed by the processor 210, may cause the electronic device 200 to adjust a display direction of the content and a size of the content while adjusting a size of the first area. The adjusted size of the content may correspond to a size of the second area.

According to an example embodiment, the instructions, when executed by the processor 210, may cause the electronic device 200 to display at least one object (e.g., a graphic object) for displaying the content in the maximum size on the content.

According to an example embodiment, the at least one object may include an object indicating an extension or reduction direction of the first area.

According to an example embodiment, a method for operating an electronic device 200 includes displaying content via at least a portion of a first area of a flexible display 220, identifying an aspect ratio of the content, obtaining orientation information of the electronic device, and identifying size information of a second area of the flexible display 220 capable of maximally displaying the content with the identified aspect ratio of the content based on the obtained orientation information, the first area and the second area being one surface of an exposed area of the flexible display 220, and the second area being an area extended or reduced from the first area.

According to an example embodiment, the method may further include adjusting the one surface of the exposed area from the first area to the second area using the driving device 250.

According to an example embodiment, the method may further include determining whether to change a display direction of the content based on reference screen information.

According to an example embodiment, the reference screen information may include minimum size information and maximum size information of the one surface of the exposed area, and the method may further include identifying orientation when a size of the one surface of the exposed area is minimum as a first orientation, identifying orientation when the size of the one surface of the exposed area is maximum as a second orientation, and comparing the first orientation and the second orientation with each other to determine whether to change the display direction.

According to an example embodiment, the first orientation and the second orientation may be one of a vertical orientation or a horizontal orientation.

According to an example embodiment, the method may further include providing a user interface (UI) for requesting rotation of the electronic device 200 when the display direction is changed.

According to an example embodiment, the method may further include identifying a contact of an external object with a variable area of the flexible display 220 and providing a UI for requesting release of the contact.

According to an example embodiment, adjusting of a size of the first area may include adjusting a display direction of the content and a size of the content, and the adjusted size of the content may correspond to a size of the second area.

According to an example embodiment, the method may further include displaying at least one object for displaying the content in the maximum size on the content.

According to an example embodiment, the at least one graphic object may include an object indicating an extension or reduction direction of the first area.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing connected with the first housing and configured to perform a sliding operation;
   a driving device, comprising a motor, configured to adjust the sliding operation;
   a flexible display comprising a visually exposed area on a front surface of the electronic device that changes in size in response to the sliding operation of the second housing;
   at least one sensor;
   memory storing instructions; and at least one processor comprising processing circuitry configured, individually or collectively, to execute the instructions and to control the electronic device to:
- obtain orientation information of the electronic device using the at least one sensor;
- in a state in which the exposed area of the flexible display corresponds to a first area, display content and a letter box on the first area;
- based on identifying a full screen event based on a user input, determine whether an orientation of the content and an orientation of the electronic device are the same;
- based on determining that the orientation of the content and the orientation of the electronic device are not the same,
  - change the orientation of the content so that the orientation of the content and the orientation of the electronic device are aligned;
  - identify a size of a second area, which is a display area corresponding to a size of content enlarged while maintaining an aspect ratio of the content until the letter box is removed;
  - change, using the driving device, the exposed area of the flexible display to the second area; and
  - display, on the second area, the enlarged content.

2. The electronic device of claim 1, wherein at least one processor comprising processing circuitry is configured individually or collectively to control the electronic device to determine that the orientation of the content and the orientation of the electronic device are not the same when the aspect ratio of the content does not correspond to an aspect ratio of the electronic device.

3. The electronic device of claim 1, wherein the aspect ratio of the content corresponds to one of a vertical orientation or a horizontal orientation.

4. The electronic device of claim 1, wherein the aspect ratio of the electronic device corresponds to one of a vertical orientation or a horizontal orientation.

5. The electronic device of claim 1, wherein at least one processor comprising processing circuitry is configured individually or collectively to control the electronic device to provide a user interface (UI) for requesting rotation of the electronic device when the orientation of the content is changed.

6. The electronic device of claim 1, wherein at least one processor comprising processing circuitry is configured individually or collectively to control the electronic device to provide a UI for requesting release of a contact when an external object identified via the at least one sensor is in contact with a changeable area of the flexible display.

7. The electronic device of claim 1, wherein at least one processor comprising processing circuitry is configured individually or collectively to control the electronic device to adjust the orientation of the content and a size of the content while adjusting a size of the first area, and
wherein the adjusted size of the content corresponds to a size of the second area.

8. The electronic device of claim 1, wherein at least one processor comprising processing circuitry is configured individually or collectively to control the electronic device to display at least one object for displaying the content in a maximum size.

9. The electronic device of claim 8, wherein the at least one object includes an object indicating an extension or reduction direction of the first area.

10. A method for operating an electronic device, the method comprising:
- obtaining orientation information of the electronic device;
- in a state in which an exposed area of a flexible display of the electronic device corresponds to a first area, displaying content and a letter box on the first area;
- based on identifying a full screen event based on a user input, determining whether an orientation of the content and an orientation of the electronic device are the same;
- based on determining that the orientation of the content and the orientation of the electronic device are not the same,
  - changing the orientation of the content so that the orientation of the content and the orientation of the electronic device are aligned;
  - identifying a size of a second area, which is a display area corresponding to a size of content enlarged while maintaining an aspect ratio of the content until the letter box is removed;
  - changing the exposed area of the flexible display to the second area; and
  - displaying, on the second area, the enlarged content.

11. The method of claim 10, further comprising:
determining that the orientation of the content and the orientation of the electronic device are not the same when the aspect ratio of the content does not correspond to an aspect ratio of the electronic device.

12. The method of claim 10, wherein the aspect ratio of the content corresponds to one of a vertical orientation or a horizontal orientation.

13. The method of claim 10, wherein the aspect ratio of the electronic device corresponds to one of a vertical orientation or a horizontal orientation.

14. The method of claim 10, further comprising:
providing a user interface (UI) for requesting rotation of the electronic device when the orientation of the content is changed.

15. The method of claim 10, further comprising:
- identifying a contact of an external object with a changeable area of the flexible display; and
- providing a UI for requesting release of the contact.

16. The method of claim 10, wherein adjusting of a size of the first area includes adjusting the orientation of the content and a size of the content, and
wherein the adjusted size of the content corresponds to a size of the second area.

17. The method of claim 10, further comprising:
displaying at least one object for displaying the content in a maximum size.

18. The method of claim 17, wherein the at least one object includes an object indicating an extension or reduction direction of the first area.

* * * * *